US012106396B2

(12) United States Patent
Suzuki

(10) Patent No.: US 12,106,396 B2
(45) Date of Patent: Oct. 1, 2024

(54) INFORMATION PROCESSING DEVICE, INFORMATION DISPLAY SYSTEM, AND INFORMATION DISPLAY METHOD FOR DISPLAY OF DEVICE STATE INFORMATION

(71) Applicant: SONY GROUP CORPORATION, Tokyo (JP)

(72) Inventor: Toshihiko Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 30 days.

(21) Appl. No.: 17/759,619

(22) PCT Filed: Dec. 11, 2020

(86) PCT No.: PCT/JP2020/046373
§ 371 (c)(1),
(2) Date: Jul. 27, 2022

(87) PCT Pub. No.: WO2021/157198
PCT Pub. Date: Aug. 12, 2021

(65) Prior Publication Data
US 2023/0050725 A1     Feb. 16, 2023

(30) Foreign Application Priority Data

Feb. 4, 2020     (JP) .................. 2020-017111

(51) Int. Cl.
*G06T 11/00* (2006.01)
*G06F 3/0482* (2013.01)
*G08C 17/02* (2006.01)

(52) U.S. Cl.
CPC ............ *G06T 11/00* (2013.01); *G06F 3/0482* (2013.01); *G08C 17/02* (2013.01); *G06T 2200/24* (2013.01)

(58) Field of Classification Search
CPC ....................................... G06T 11/00
See application file for complete search history.

(56) References Cited

U.S. PATENT DOCUMENTS

| | | | | |
|---|---|---|---|---|
| 2010/0325490 A1* | 12/2010 | Anvin | ................. | G06F 11/0769 |
| | | | | 714/E11.029 |
| 2013/0283185 A1* | 10/2013 | Mock | ....................... | H04N 7/15 |
| | | | | 715/746 |

FOREIGN PATENT DOCUMENTS

| | | |
|---|---|---|
| JP | 2004-023194 A | 1/2004 |
| JP | 2017-063320 A | 3/2017 |
| JP | 2019-175406 A | 10/2019 |

OTHER PUBLICATIONS

International Search Report and Written Opinion of PCT Application No. PCT/JP2020/046373, issued on Mar. 9, 2021, 08 pages of ISRWO.

* cited by examiner

*Primary Examiner* — Shivang I Patel
(74) *Attorney, Agent, or Firm* — CHIP LAW GROUP

(57) ABSTRACT

An information processing device according to the present technology includes a transmission processing unit that performs processing for transmitting device state information relating to a selected item to an external device of a request source, in response to a request for the device state information relating to the selected item that has been made by the external device, by using code information indicating the selected item, the selected item being an item that has been selected by a user for the device state information indicating a state of a device.

12 Claims, 14 Drawing Sheets

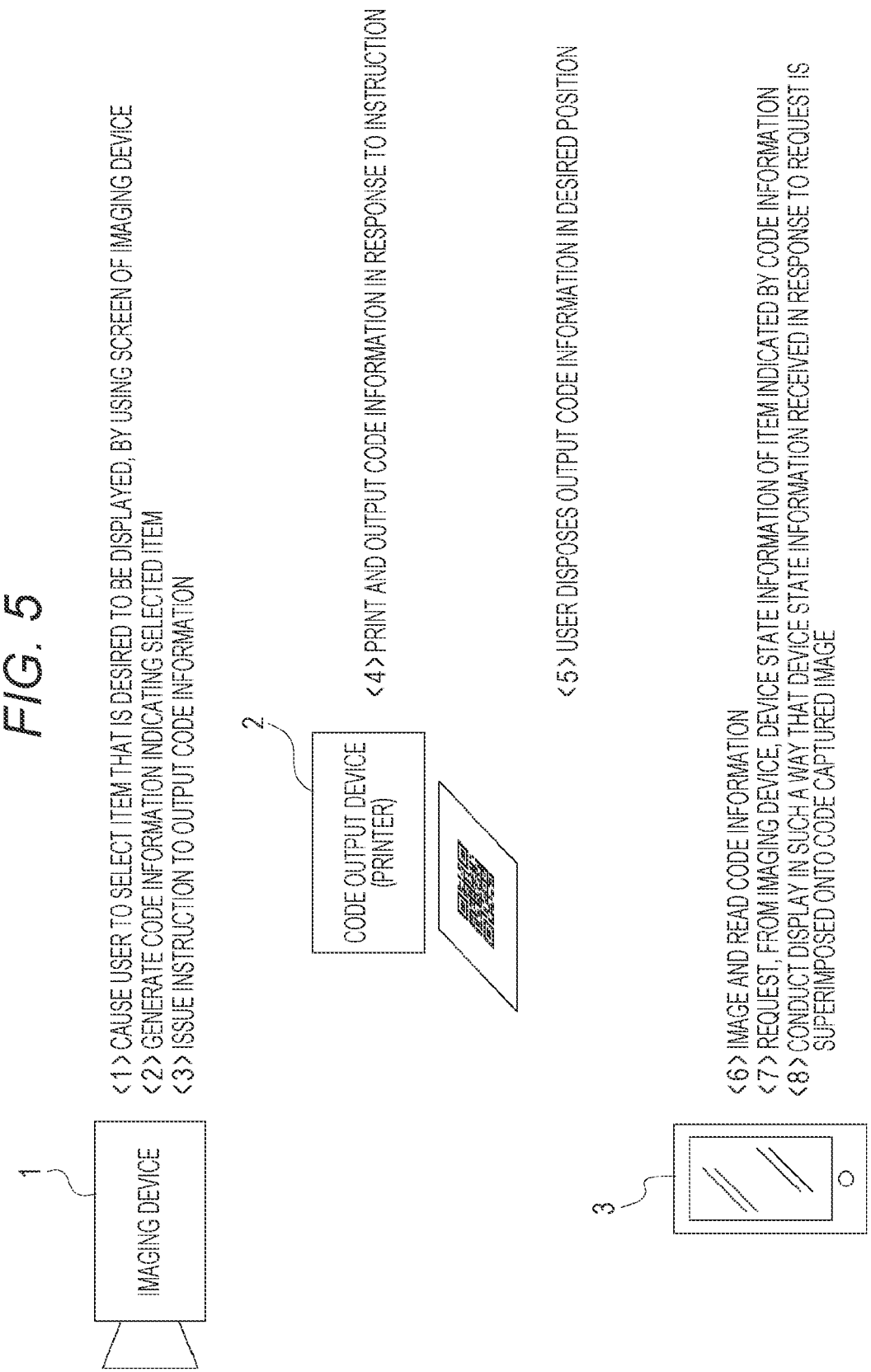

FIG. 7

| ITEM | INFORMATION |
|---|---|
| RECORDING/REPRODUCING OPERATION STATE | STANDBY |
| LOAD STATE | ××% |
| ⋮ | ⋮ |
| SYSTEM FREQUENCY | ○○MHz |
| RECORDING FORMAT | MPEG |
| ⋮ | ⋮ |
| REMAINING BATTERY CAPACITY | ×△% |
| REMAINING MEDIUM CAPACITY | ○□% |

STATE MANAGEMENT INFORMATION

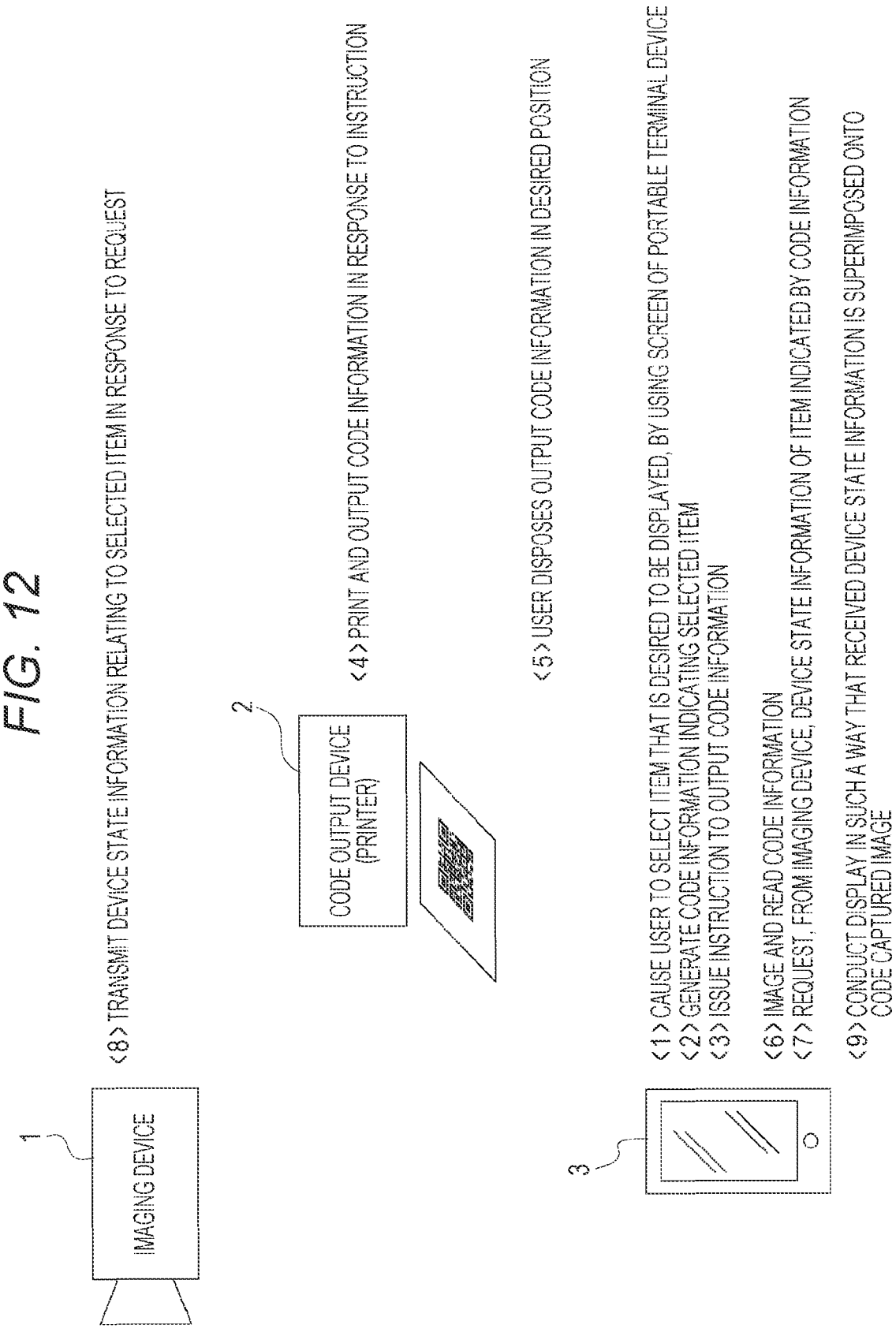

INFORMATION PROCESSING DEVICE, INFORMATION DISPLAY SYSTEM, AND INFORMATION DISPLAY METHOD FOR DISPLAY OF DEVICE STATE INFORMATION

CROSS REFERENCE TO RELATED APPLICATIONS

This application is a U.S. National Phase of International Patent Application No. PCT/JP2020/046373 filed on Dec. 11, 2020, which claims priority benefit of Japanese Patent Application No. JP 2020-017111 filed in the Japan Patent Office on Feb. 4, 2020. Each of the above-referenced applications is hereby incorporated herein by reference in its entirety.

TECHNICAL FIELD

The present technology pertains to an information processing device, an information display system, and an information display method, and in particular, relates to a technical field pertaining to the display of device state information that is information indicating a state of a device.

BACKGROUND ART

In general, some pieces of electronic equipment such as a camera or audio equipment have a function of displaying information indicating a state of a device, such as an operation state or a setting state (information indicating current settings) of equipment, (hereinafter referred to as "device state information"), and this enables a user to check the state of the device.

Note that an example of a related conventional technology is Patent Document 1. Patent Document 1 discloses a technology in which in a camera system including a plurality of cameras, a QR code (registered trademark) of each parameter value to be set in each of the plurality of cameras is generated and is output by using a means such as printing, and a device that has read the QR code sets a parameter value indicated by the QR code in a corresponding camera.

CITATION LIST

Patent Document

Patent Document 1: Japanese Patent Application Laid-Open No. 2017-63320

SUMMARY OF THE INVENTION

Problems to be Solved by the Invention

Here, in general, the device state information is displayed in a display mounted on equipment or a display in another device that is associated with the equipment, such as a remote controller.

However, in any of these cases, the device state information is displayed in a specified display device, and it is difficult to display the device state information in an arbitrary place desired by a user.

Furthermore, a region where the device state information is displayed is finite, and therefore it is desirable that only an item that a user desires to check of the device state information be displayed.

The present technology has been developed in view of the circumstances described above, and it is an object of the present technology to enable device state information that a user desires to check to be displayed in a place desired by the user.

Solutions to Problems

An information processing device according to the present technology includes a transmission processing unit that performs processing for transmitting device state information relating to a selected item to an external device of a request source, in response to a request for the device state information relating to the selected item that has been made by the external device, by using code information indicating the selected item, the selected item being an item that has been selected by a user for the device state information indicating a state of a device.

The code information means a system of symbols for expressing information. The "symbol" described here is a concept that does not only include a mark or a pattern but also includes a character, a number, or the like.

As described above, code information indicating an item selected by a user is used, and therefore only device state information that the user desires to check can be transmitted to an external device. Furthermore, device state information that corresponds to a device of a request source is transmitted in response to a request that has been made by using code information, and therefore a device that will receive and display the transmitted device state information can be an arbitrary device. In other words, device state information can be displayed in an arbitrary place.

The information processing device according to the present technology that has been described above can have a configuration including a code information generation unit that generates the code information indicating the selected item on the basis of a manipulation performed by the user.

By doing this, communication with another device can be omitted in generating code information.

The information processing device according to the present technology that has been described above can have a configuration in which the external device repeatedly makes the request, and the transmission processing unit performs processing for obtaining and transmitting the device state information for each of the requests from the external device.

By doing this, roughly real-time state information can be transmitted as device state information. Here, roughly real time does not only mean strict real time, but is a concept that includes immediate time, the same time, real time, or immediate time, the same time, or real time including various types of delay time or the like.

An information display system according to the present technology is an information display system that includes at least an information processing device and a display device, the information display system including: a code information generation unit that generates code information indicating a selected item, the selected item being an item that has been selected by a user for device state information indicating a state of the information processing device; a code information output unit that outputs the code information that has been generated by the code information generation unit; a request unit that is provided in the display device, reads the code information that has been output by the code information output unit, and makes a request for the information processing device to transmit the device state information relating to the selected item indicated by the code information; a transmission processing unit that is provided in the information processing device, and performs processing for transmitting the device state information relating to the selected item to the display device, in response to the request; and a display processing unit that is provided in the display device, and performs processing for displaying the device state information that has been transmitted by the transmission processing unit.

By employing such an information display system according to the present technology, effects that are similar to effects of the information processing device according to the present technology that has been described above can also be exhibited.

In the information display system according to the present technology that has been described above, the code information output unit can be configured to print and output the code information.

By doing this, a printed medium such as a paper sheet on which the code information has been printed can be disposed in an arbitrary position, and the code information can be displayed in an arbitrary position desired by a user.

In the information display system according to the present technology that has been described above, the code information output unit can be configured to display and output the code information.

In other words, the code information is displayed by a display device.

In the information display system according to the present technology that has been described above, the code information generation unit can be provided in the display device.

By doing this, a manipulation relating to generation of code information, such as a manipulation to select an item of device state information that is desired to be displayed, can be received on a side of the display device.

In the information display system according to the present technology that has been described above, the display processing unit can be configured to switch a display mode of the device state information according to a type of the device state information.

By doing this, device state information can be displayed by using an appropriate mode according to the type of device state information, for example, in such a way that with respect to device state information in which a state of a device is expressed as an amount, such as a remaining battery capacity, the amount is displayed by using a bar, or in such a way that with respect to device state information indicating a recording/reproducing operation state, such as REC, PLAY, or STANDBY, a display is conducted by using a mark that corresponds to each of the states (for example, a red circular mark in the case of REC, a rightward pointing triangular mark in the case of PLAY, or the like).

In the information display system according to the present technology that has been described above, the display processing unit can be configured to perform processing for superimposing the device state information onto a captured image obtained by imaging the code information in order to read the code information, and displaying the device state information.

By doing this, the display device is directed to a direction of a display position of the code information (a camera that is provided in the display device and reads the code information is directed), and therefore device state information can be displayed to a user.

In the information display system according to the present technology that has been described above, the display processing unit can be configured to perform processing for displaying the device state information in a position on the captured image, the position having been specified by using, as a reference, a position of the code information in the captured image.

By doing this, on the captured image, device state information can be displayed in a position that has a predetermined positional relationship with a position of code information, such as a position that does not overlap the code information or a position that overlaps the code information.

Furthermore, an information display method according to the present technology is an information display method in an information display system that includes at least an information processing device and a display device, the information display method including: generating code information indicating a selected item, the selected item being an item that has been selected by a user for device state information indicating a state of the information processing device; and outputting the code information that has been generated, in which the display device performs reading the code information that has been output, and requesting, from the information processing device, the device state information relating to the selected item indicated by the code information, the information processing device performs processing for transmitting the device state information relating to the selected item to the display device, in response to the requesting, and the display device performs processing for displaying the device state information that has been transmitted.

By employing such an information display method, effects that are similar to effects of the information processing device or the information display system according to the present technology that has been described above can also be exhibited.

BRIEF DESCRIPTION OF DRAWINGS

FIG. 5 is an explanatory diagram of specific operations achieved in the information display system serving as the first embodiment.

FIG. 7 is a diagram illustrating an example of state management information.

FIG. 12 explains specific operations achieved in an information display system serving as a second embodiment.

MODES FOR CARRYING OUT THE INVENTION

Embodiments are described below in the following order.
<1. First Embodiment>
[1-1. System Configuration Example]
[1-2. Information Display Technique Serving as Embodiment]
[1-3. Processing Procedures]
<2. Second Embodiment>
<3. Variations>
<4. Summary of Embodiments>
<5. Present Technology>

1. First Embodiment

1-1. System Configuration Example

Figure 1:
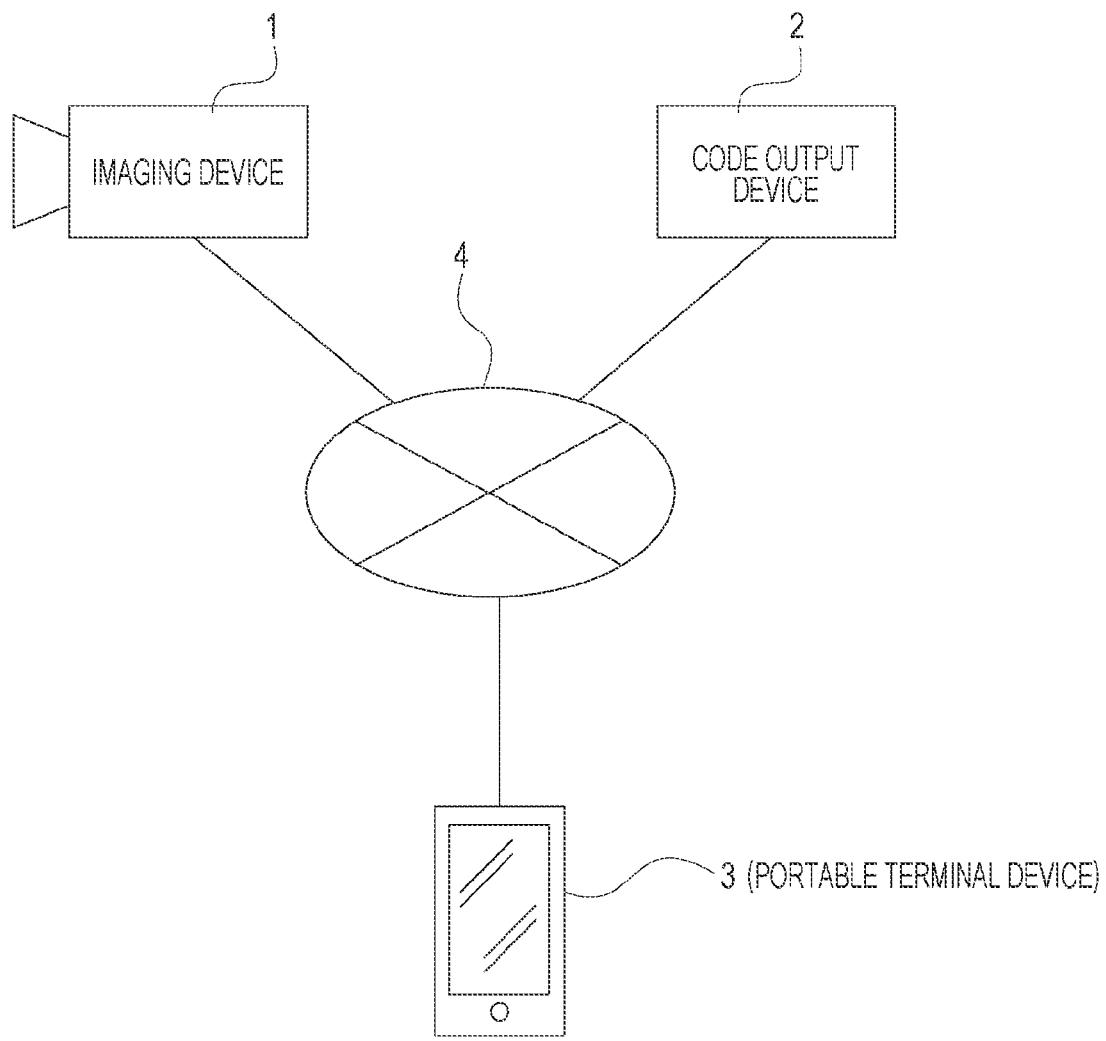
FIG. 1 is a block diagram illustrating a configuration example of an information display system serving as an embodiment according to the present technology.

FIG. 1 is a block diagram illustrating a configuration example of an information display system 100 serving as an embodiment according to the present technology.

The information display system 100 includes at least an imaging device 1, a code output device 2, and a portable terminal device 3. The imaging device 1 is an embodiment of an information processing device according to the present technology, and the portable terminal device 3 is an embodiment of a display device according to the present technology.

The imaging device 1 is configured, for example, as a digital video camera, and can generate moving image data as captured image data. In the present example, the imaging device 1 is, for example, a camera for business use, and it is assumed that a use environment of the imaging device 1 is a movie shooting site or the like.

The code output device 2 is configured as a device that outputs code information such as a QR code (registered trademark) described later. Examples of a specific device form of the code output device 2 include a device form of a printer that prints and outputs code information and a device form of a display that displays and outputs the code information.

The portable terminal device 3 is portable electronic equipment (having portability) that is assumed to be used by a user of the information display system 100, and includes at least a display (a display device) that can display an image, and a function of reading code information. Examples of a specific device form of the portable terminal device 3 include device forms of a smartphone, a tablet terminal, augmented reality (AR) glasses, a laptop personal computer, and the like.

The information display system 100 has a configuration in which the imaging device 1 and the code output device 2, and the imaging device 1 and the portable terminal device 3 can mutually perform data communication. In the present example, the imaging device 1, the code output device 2, and the portable terminal device 3 can mutually perform data communication via a network 4.

Examples of the network 4 include a local area network (LAN), the Internet, and the like.

Note that in order to enable the imaging device 1 and the code output device 2, and the imaging device 1 and the portable terminal device 3 to mutually perform data communication, it is not essential to employ a configuration in which the imaging device 1, the code output device 2, and the portable terminal device 3 are connected to the network 4, as described above.

Figure 2:
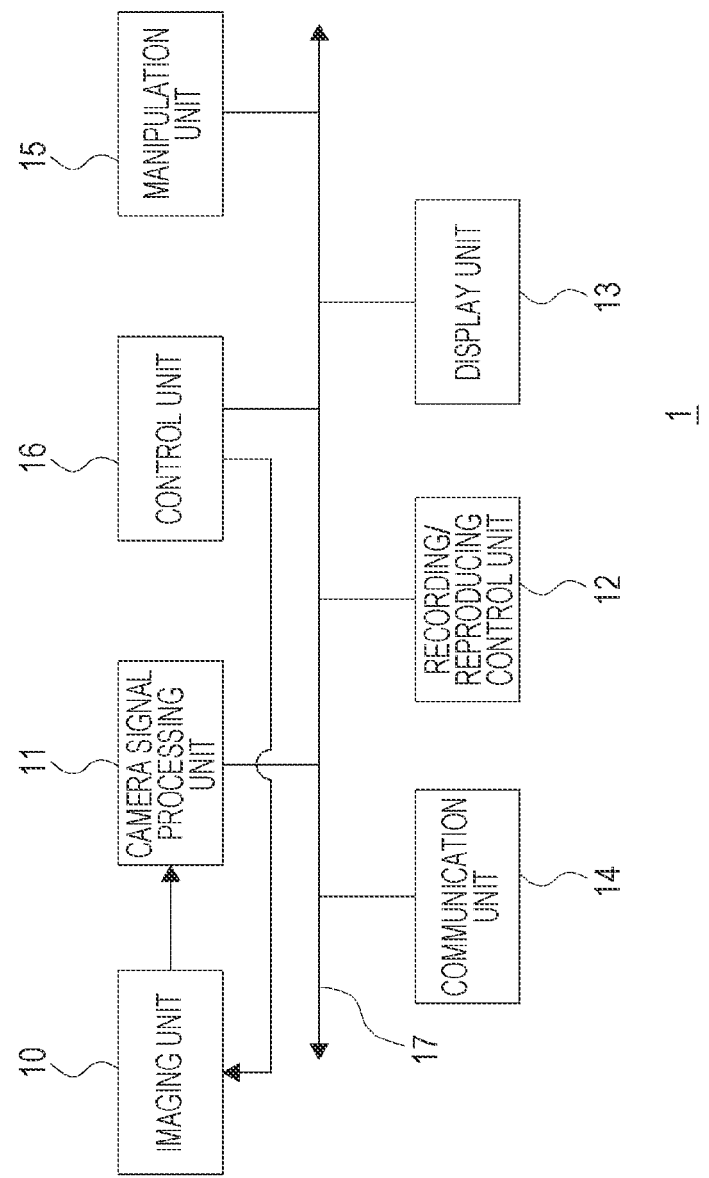
FIG. 2 is a block diagram illustrating an internal configuration example of an information processing device serving as an embodiment.

FIG. 2 is a block diagram illustrating an internal configuration example of the imaging device 1.

The imaging device 1 includes an imaging unit 10, a camera signal processing unit 11, a recording/reproducing control unit 12, a display unit 13, a communication unit 14, a manipulation unit 15, a control unit 16, and a bus 17, and is configured to be able to image a subject and record, in a recording medium, image data serving as a video or a still image.

The camera signal processing unit 11, the recording/reproducing control unit 12, the display unit 13, the communication unit 14, the manipulation unit 15, and the control unit 16 can mutually perform data communication via the bus 17.

The imaging unit 10 includes a camera optical system that includes a lens, such as a cover lens, a zoom lens, or a focus lens, a shutter, a diaphragm mechanism, or the like, and an imaging element of, for example, a complementary metal oxide semiconductor (CMOS) type, a charge coupled device (CCD) type, or the like that receives light from a subject that has entered by using the camera optical system.

The imaging unit 10 performs, for example, correlated double sampling (CDS) processing, automatic gain control (AGC) processing, or the like on an electrical signal that has been obtained by performing optical-to-electrical conversion on light received by the imaging element, and further performs analog/digital (A/D) conversion processing. Then, a captured image signal serving as a digital signal is output to the camera signal processing unit 11 in a rear stage.

The camera signal processing unit 11 is configured as an image processing processor by using, for example, a digital signal processor (DSP) or the like. The camera signal processing unit 11 performs various types of signal processing on a digital signal (a captured image signal) from the imaging unit 10. For example, as camera processing, the camera signal processing unit 11 performs preprocessing, synchronization processing, YC generation processing, resolution conversion processing, codec processing, or the like.

In the preprocessing, clamp processing for clamping a black level of RGB to a predetermined level, correction processing between color channels of RGB, or the like is performed on the captured image signal from the imaging unit 10. In the synchronization processing, color separation processing is performed in such a way that image data for each pixel has all of the color components RGB. For example, in the case of an imaging element using a Bayer arrangement color filter, demosaic processing is performed as the color separation processing. In the YC generation processing, a luminance (Y) signal and a color (C) signal are generated (separated) from image data of RGB. In the resolution conversion processing, resolution conversion processing is performed on image data that various types of signal processing have been performed on.

In the codec processing, for example, coding processing for recording or for communication or file generation is performed on image data that the various types of processing described above have been performed on. In the codec processing of the present example, a file according to a video file format such as moving picture experts group (MPEG)-2 or H. 264 can be generated. Furthermore, it is also conceivable that a file according to a format such as joint photographic experts group (JPEG), tagged image file format (TIFF), or graphics interchange format (GIF) is generated as a still image file.

The recording/reproducing control unit 12 performs recording/reproducing on a recording medium using, for example, a non-volatile memory. The recording/reproducing control unit 12 performs, for example, processing for recording an image file such as video data or still image data, a thumbnail image, or the like in the recording medium.

A variety of actual forms of the recording/reproducing control unit 12 are conceivable. For example, the recording/reproducing control unit 12 may be configured as a flash memory incorporated into the imaging device 1 and its writing/reading circuit, or may be a form using a card recording/reproducing unit that performs recording/reproducing access to a recording medium that can be attached to the imaging device 1, such as a memory card (a portable flash memory or the like). Furthermore, a form incorporated into the imaging device 1 may be achieved by using a hard disk drive (HDD) or the like.

The display unit 13 is a display unit that conducts various displays for a person who captures an image, and is, for example, a display panel, a viewfinder, or the like that uses a display device, such as a liquid crystal display (LCD) or an organic electro-luminescence (EL) display, that is disposed in a housing of the imaging device 1.

The display unit 13 conducts various displays on a display screen on the basis of an instruction of the control unit 16. For example, the display unit 13 displays a reproduced image of image data that has been read from a recording medium by the recording/reproducing control unit 12.

Furthermore, in some cases, the display unit 13 is supplied with image data of a captured image in which a resolution has been converted for a display by the camera signal processing unit 11, and the display unit 13 conducts a display on the basis of the image data of the captured image in response to an instruction of the control unit 16. By doing this, what is called a through image (a monitoring image of a subject) that serves as a captured image during composition checking is displayed.

Furthermore, the display unit 13 conducts a display of various manipulation menus, icons, messages, or the like, that is, a graphical user interface (GUI) on a screen on the basis of an instruction of the control unit 16.

The communication unit 14 performs data communication with external equipment or network communication by wire or wirelessly.

For example, captured image data (a still image file or a video file) can be transmitted and output to an external display device, recording device, reproduction device, or the like.

Furthermore, the communication unit 14 can perform communication by using a predetermined network such as the Internet or LAN, and can transmit or receive various types of data to/from a server, a terminal (for example, the portable terminal device 3), or the like on the network.

The manipulation unit 15 collectively indicates an input device that is used by a user to input various manipulations. Specifically, the manipulation unit 15 indicates various manipulators (a key, a dial, a touch panel, a touch pad, or the like) that is provided in the housing of the imaging device 1.

A user's manipulation is sensed by the manipulation unit 15, and a signal that corresponds to an input manipulation is transmitted to the control unit 16.

The control unit 16 includes a microcomputer (an arithmetic processing device) that includes a central processing unit (CPU), a read only memory (ROM), and a random access memory (RAM).

In the ROM of the control unit 16, an operating system (OS) that causes the CPU to control each unit, application programs for various operations, firmware, or the like is stored. The RAM of the control unit 16 serves as a working area in various types of data processing performed by the CPU, and is used to transitorily store data, a program, or the like.

The CPU executes a program stored in the ROM or the like, and therefore the control unit 16 performs entire control on the imaging device 1.

For example, the control unit 16 controls the shutter speed of the imaging unit 10, or issues instructions of various types of signal processing performed by the camera signal processing unit 11. Furthermore, the control unit 16 controls an operation of each required unit for an imaging operation or a recording operation according to a user's manipulation, an operation to reproduce a recorded image file, a user interface operation, or the like. Moreover, the control unit 16 issues, to the imaging unit 10, an operation instruction regarding zooming, focusing, diaphragm adjustment, or the like in the camera optical system.

Figure 3:
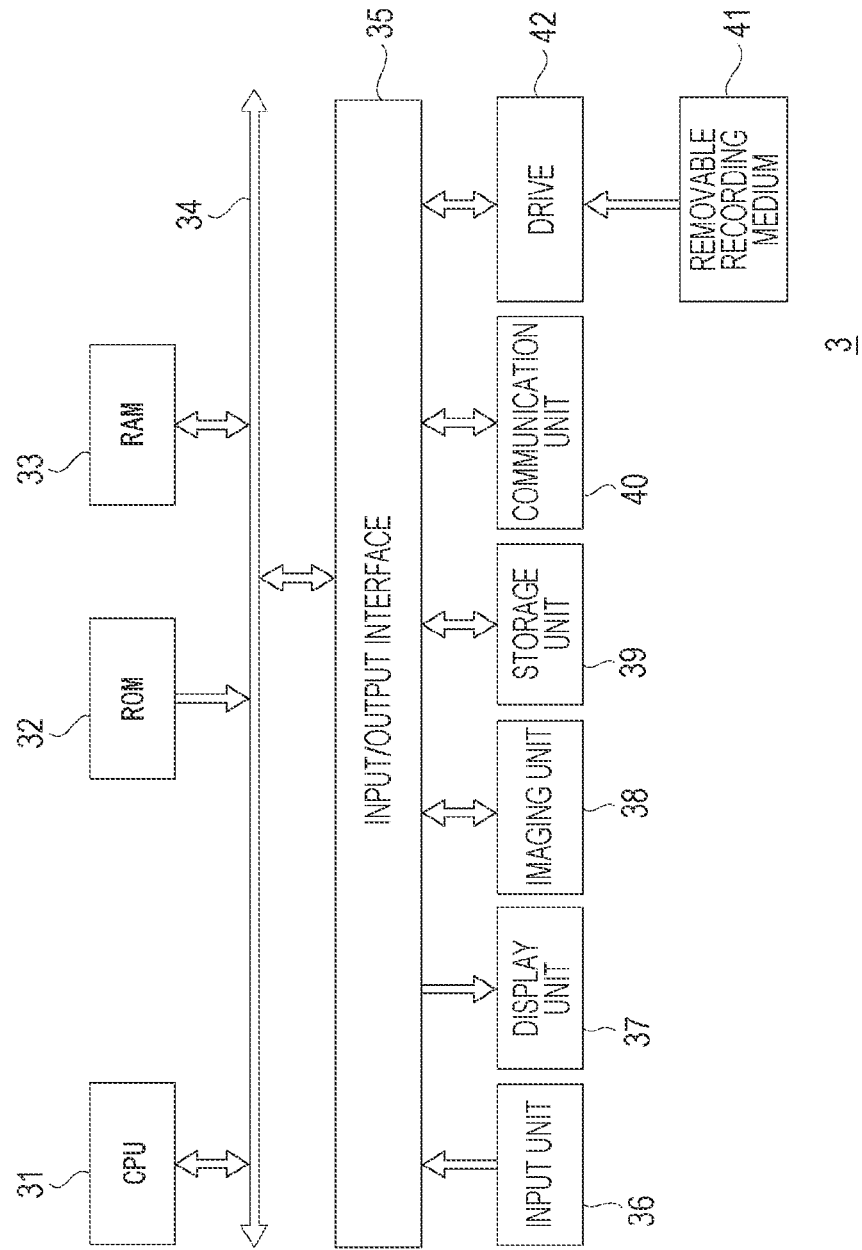
FIG. 3 is a block diagram illustrating an internal configuration example of a display device serving as an embodiment.

FIG. 3 is a block diagram illustrating an internal configuration example of the portable terminal device 3.

In FIG. 3, a CPU 31 of the portable terminal device 3 performs various types of processing according to a program stored in a ROM 32 or a program that has been loaded from a storage unit 39 described later into a RAM 33. In the RAM 33, data required for the CPU 31 to perform various types of processing, or the like is also appropriately stored. The CPU 31, the ROM 32, and the RAM 33 are connected to each other via a bus 34. This bus 34 is also connected to an input/output interface 35.

The input/output interface 35 is connected to an input unit 36 that includes a manipulator or a manipulation device. For example, it is assumed that the input unit 36 is various manipulators or manipulation devices such as a touch panel, a mouse, a keyboard, a touch pad, a key, a dial, or a remote controller.

A user's manipulation is sensed by the input unit 36, and a signal that corresponds to an input manipulation is interpreted by the CPU 31.

Furthermore, the input/output interface 35 is connected to a display unit 37 including an LCD, an organic EL panel, or the like, or an imaging unit 38.

The display unit 37 is configured as a display device that can display an image, and is a display device that is provided, for example, in a housing of the portable terminal device 3.

The display unit 37 conducts a display of various images, a captured image obtained by the imaging unit 38, or the like on a display screen on the basis of an instruction of the CPU 31. Furthermore, the display unit 37 conducts a display of various manipulation menus, icons, messages, or the like, that is, a graphical user interface (GUI) on the basis of an instruction of the CPU 31.

The imaging unit 38 includes an imaging element of, for example, a CMOS type, a CCD type, or the like, and obtains a captured image signal using a digital signal, as a signal of a captured image obtained by imaging a subject.

The input/output interface 35 is connected to a storage unit 39 that includes a hard disk, a solid-state memory, or the like, or a communication unit 40 that performs communication with an external device. The communication unit 40 performs communication processing via a network such as the LAN or the Internet, or performs communication using wired/wireless communication, bus communication, or the like with various types of equipment. This communication unit 40 enables the portable terminal device 3 (the CPU 31) to perform data communication with the imaging device 1 or the code output device 2 via the network 4 indicating FIG. 1.

The input/output interface 35 is also connected to a drive 42. A removable recording medium 41, such as a magnetic disk, an optical disk, a magneto-optical disk, or a semiconductor memory, is appropriately attached to the drive 42. The drive 42 enables various types of data (for example, an image, a computer program, or the like) to be read from the removable recording medium 41. Read data is stored in the storage unit 39, or an image included in the data is output in the display unit 37. Furthermore, a computer program read from the removable recording medium 41 is installed in the storage unit 39 as needed.

1-2. Information Display Technique Serving as Embodiment

An information display technique serving as an embodiment is described below with reference to FIGS. 4A, 4B, 5, 6A, 6B, 6C, 7, 8A, 8B, and 8C.

Figure 4A:
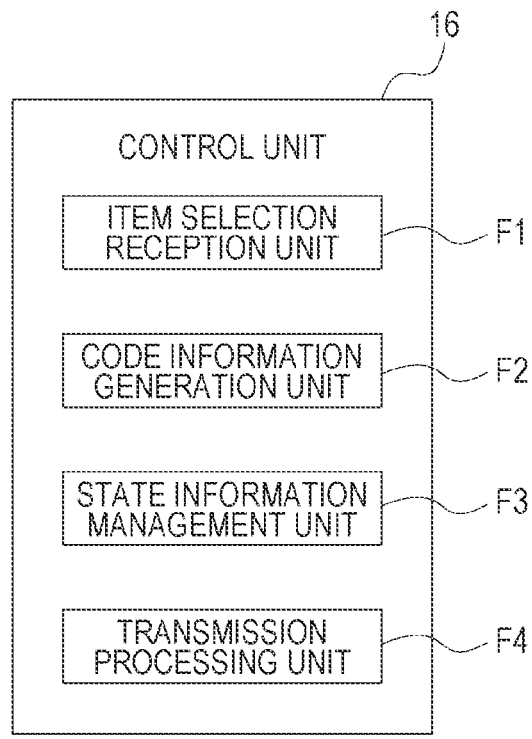
FIGS. 4A and 4B are function block diagrams illustrating functions of an information display system serving as a first embodiment in the form of a block.
Figure 4B:
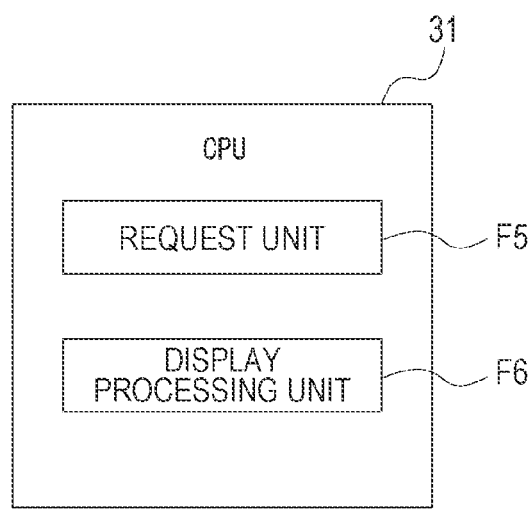

FIGS. 4A and 4B are function block diagrams illustrating functions of the information display system 100 in the form of a block, FIG. 4A is a function block diagram illustrating functions of the control unit 16 in the imaging device 1, and FIG. 4B is a function block diagram illustrating functions of the CPU 31 of the portable terminal device 3. Note that in FIGS. 4A and 4B, only functions relating to the information display technique serving as an embodiment from among various functions of the control unit 16 and the CPU 31 are extracted and illustrated.

In FIG. 4A, the control unit 16 functions as an item selection reception unit F1, a code information generation unit F2, a state information management unit F3, and a transmission processing unit F4.

The item selection reception unit F1 receives selection as to which item of device state information Is serving as information indicating a state of the imaging device 1 is to be displayed.

Here, the device state information Is can be roughly divided into setting state information Iss indicating a setting state and operation state information Ism indicating an operation state of a target device.

In the present example where the target device is the imaging device 1, specific examples of the setting state information Iss include a frame rate, a recording format (for example, a distinction between MPEG and H. 264, or the like), an F value, a system frequency, and the like.

Furthermore, specific examples of the operation state information Ism include a recording/reproducing operation state (PLAY/REC/STANDBY), a load state (for example, a load state of the camera signal processing unit 11 or the CPU in the control unit 16), a remaining medium capacity (a remaining recordable capacity of a recording medium that has been determined as a target of recording a captured image by the recording/reproducing control unit 12), and a remaining battery capacity (a remaining capacity of a battery to be used as a power source of the imaging device 1).

The item selection reception unit F1 receives selection of an item from a user with respect to various items of device state information Is, as described above as an example.

The code information generation unit F2 generates code information indicating a selected item serving as an item selected by a user. The code information means a system of symbols for expressing information. The "symbol" described here is a concept that does not only include a mark or a pattern but also includes a character, a number, or the like.

A variety of examples of the code information are conceivable. Examples include information using a QR code (registered trademark), a barcode, or text such as a uniform resource identifier (URI), and the like. In particular, in the present example, as the code information, information that can be output as visual information is used (information that can be printed and output or can be displayed and output is used, as described later).

The state information management unit F3 manages current information with respect to device state information Is serving as a candidate for a user's selection (that is, device state information Is serving as a candidate for selection at the time of reception of selection of an item).

Note that specific processing performed by this state information management unit F3 is newly described later.

In response to a request for device state information Is relating a selected item from an external device (in the present example, the portable terminal device 3) by using code information generated by the code information generation unit F2, the transmission processing unit F4 performs processing for transmitting the device state information Is relating to the selected item to the external device of a request source.

In the present example, the portable terminal device 3 includes the imaging unit 38, and can read code information. The transmission processing unit F4 in the present example performs processing for transmitting device state information Is relating to a selected item to the portable terminal device 3, in response to the request described above that has been made in response to reading performed by the portable terminal device 3 of code information (see the request unit F5 described below).

In FIG. 4B, the CPU 31 functions as a request unit F5 and a display processing unit F6.

The request unit F5 reads code information that has been output by a code information output unit, and makes a request for an information processing device (in the present example, the imaging device 1) to transmit device state information Is relating to a selected item indicated by the code information. The code information output unit corresponds to the code output device 2 in the present example.

The display processing unit F6 performs processing for displaying the device state information Is that has been transmitted by the transmission processing unit F4 in the imaging device 1 (the control unit 16). As described later, in the present example, the device state information Is is displayed in the display unit 37 of the portable terminal device 3 in such a way that the device state information Is is superimposed onto a captured image obtained by imaging code information in order to read the code information.

FIG. 5 is an explanatory diagram of specific operations achieved in the information display system 100 by using various functions, as described above.

First, the imaging device 1 performs the operations of procedure <1> to procedure <3> in the drawing.

In procedure <1>, a user is caused to select an item that is desired to be displayed, by using a screen of the imaging device 1, and in procedure <2>, code information indicating a selected item is generated. Procedure <1> corresponds to the item selection reception unit F1 described above, and procedure <2> corresponds to the code information generation unit F2.

Then, in procedure <3>, an instruction to output the code information is issued. In the present example, the code information is output by the code output device 2 serving as a printer. Therefore, in procedure <3>, an instruction to print and output the code information is issued to the code output device 2.

Upon receipt of the instruction, the code output device 2 prints and outputs the code information according to the instruction, as illustrated as procedure <4> in the drawing.

Figure 6A:
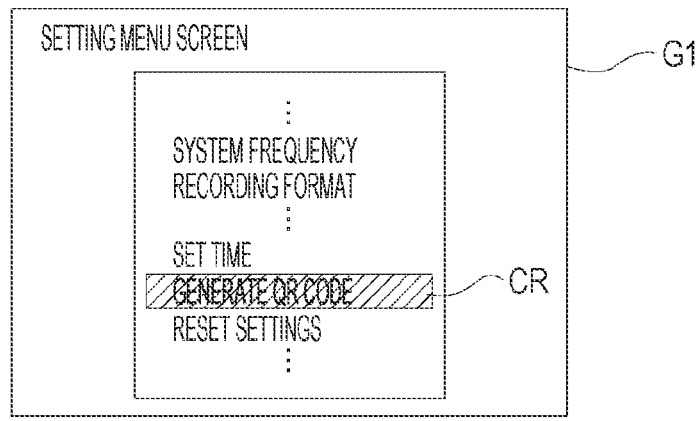
FIGS. 6A, 6B, and 6C are diagrams illustrating an example of screen transition according to selection of an item of device state information.
Figure 6B:
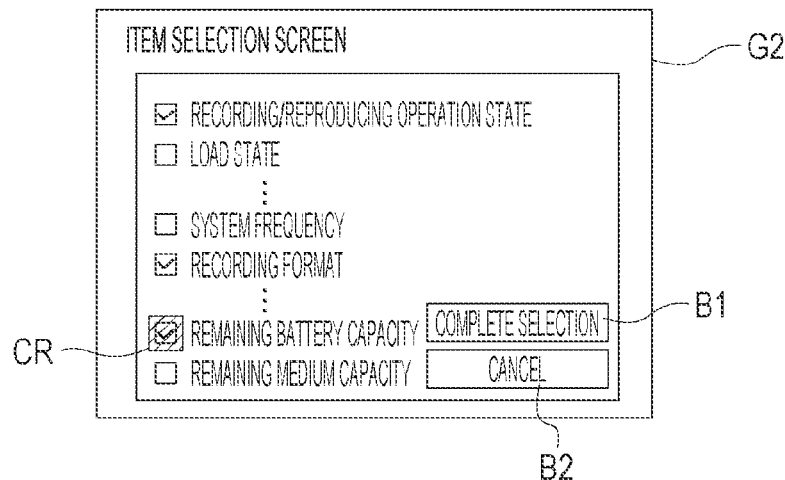
Figure 6C:
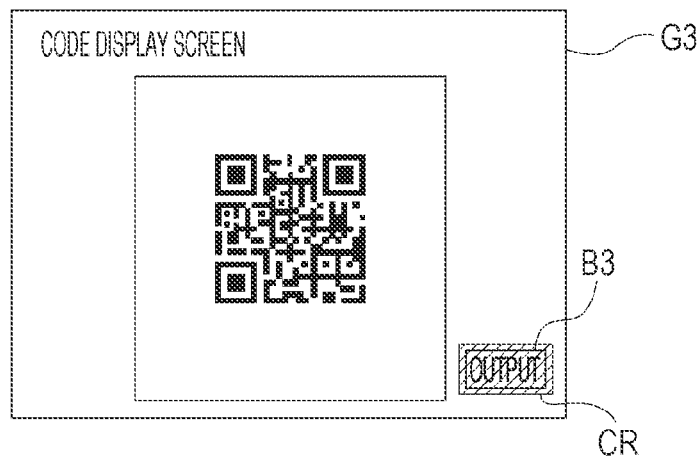

FIGS. 6A, 6B, and 6C illustrate an example of screen transition according to selection of an item of the device state information Is.

FIG. 6A illustrates an example of a menu screen G1 displayed in the display unit 13 of the imaging device 1. As illustrated, on the menu screen G1, menu items relating to various settings or operation instructions in the imaging device 1 are displayed, and an item that instructs generation of code information is displayed as one of the menu items ("generate QR code" in the drawing). In the present example, it is assumed that an item is selected on the menu screen G1 by using a cursor CR illustrated as an example in the drawing. A user can move the cursor CR by inputting a manipulation by using the manipulation unit 15, and can instruct that an item pointed by the cursor CR be selected, by performing a predetermined manipulation, such as a manipulation performed on a DETERMINE button, in a state where the cursor CR is located in a position pointing any item.

FIG. 6B illustrates an example of an item selection screen G2 displayed in the display unit 13 in response to selection of the item "generate QR code" in FIG. 6A.

On the item selection screen G2, a list of items of device state information Is serving as selection candidates is displayed, and a desired item can be selected from these items. Specifically, on the item selection screen G2 in the present example, a check box is provided for each of the items, and a user can instruct that an item be selected, by checking off the check box. In this case, it can be instructed that an item be selected, by performing a predetermined manipulation, such as a manipulation performed on a DETERMINE button, in a state where the cursor CR is located in a check box of an item that is desired to be selected.

As illustrated as an example in the drawing, in the present example, a single item cannot only be selected, but a plurality of items can also be selected.

On the item selection screen G2, a COMPLETE SELECTION button B1 and a CANCEL button B2 are provided.

The COMPLETE SELECTION button B1 is a button that instructs that selection of an item be completed. It is assumed that the CANCEL button B2 is a button for canceling generation of code information indicating a selected item. In a case where the CANCEL button B2 has been manipulated, a display of a screen in the display unit 13 is switched from a display of the item selection screen G2 to a display of the menu screen G1.

Note that it is instructed that a button disposed on a screen, such as the COMPLETE SELECTION button B1 or the CANCEL button B2, be manipulated, by performing a manipulation using the cursor CR. In other words, the control unit 16 recognizes that a certain button has been manipulated, in response to a predetermined manipulation, such as a manipulation performed on the DETERMINE button, that has been performed in a state where the certain button is pointed by the cursor CR.

FIG. 6C illustrates an example of a code display screen G3 that is displayed in response to a manipulation performed on the COMPLETE SELECTION button B1.

On the code display screen G3, code information generated by the code information generation unit F2, specifically, information indicating a QR code in the present example, is displayed.

The code information generation unit F2 generates a QR code indicating an item selected by a user, in response to a manipulation performed on the COMPLETE SELECTION button B1. Here, as the code information, for example, information including an identifier that identifies a selected item is generated.

In the present example, in the imaging device 1, each item of device state information Is, such as a recording/reproducing operation state, a load state, a system frequency, or a recording format, is managed by using an identifier that corresponds to each of the items. In response to a manipulation performed on the COMPLETE SELECTION button B1, the code information generation unit F2 in the present example generates, as the code information, information obtained by coding an identifier that corresponds to an item selected by a user from among such identifiers.

On the code display screen G3, an OUTPUT button B3 for instructing that generated code information be output is provided. In response to a manipulation performed on this OUTPUT button B3, the control unit 16 issues, to the code output device 2, an instruction to print and output the generated code information.

Note that in the present example, it is assumed that code information is output as a print output, but the code information can also be output as a display output using a predetermined display device. In this case, the control unit 16 issues, to the display device, a display output instruction as an instruction to output the generated code information.

At this time, it is also conceivable that any of a printer and the display device can be selected as an output destination of the code information. In this case, selection of the output destination of the code information may be received on a setting screen of the display unit 13.

Furthermore, it is also conceivable that on the setting screen displayed in the display unit 13, selection of an output size of the code information (at least one of selection of a size at the time of a print output or selection of a size at the time of a display output) is received.

Return to the description of FIG. 5.

In the present example, it is assumed that a user disposes code information that has been printed and output in a desired position (procedure <5> in the drawing). In the present example, the code information is information indicating an item of device state information Is of the imaging device 1, and therefore it is conceivable, for example, that the code information is disposed, for example, in a position near the imaging device 1.

In the present example, a procedure of disposing the code information in a desired position, as described above and the procedures that precede are an advance preparation stage in causing the portable terminal device 3 to display device state information Is.

Procedure <6> to procedure <8> are procedures of the portable terminal device 3.

First, in procedure <6>, the code information is imaged and read. In other words, the code information disposed in procedure <5> is imaged and read by using the imaging unit 38.

In procedure <7>, device state information Is of an item indicated by the code information is requested from the imaging device 1.

In procedure <8>, the device state information Is that has been received in response to a request is superimposed onto a code captured image, and is displayed. Here, the code captured image means a captured image obtained by imaging code information in order to read the code information. In the portable terminal device 3, the code captured image is displayed in the display unit 37 at the time of reading the code information. The device state information Is that has been received from the imaging device 1 is superimposed onto the code captured image displayed as described above, and is displayed.

Note that specific display examples of the device state information Is are described later.

Here, in the imaging device 1, in response to a request (a transmission request) for device state information Is using code information, as described above, the transmission processing unit F4 performs processing for obtaining device state information Is that corresponds to a point in time of the request, and transmitting the obtained device state information Is to the portable terminal device 3.

At this time, the transmission processing unit F4 performs processing for obtaining corresponding device state information Is from a list of pieces of device state information Is that has been managed by the state information management unit F3 described above, and transmitting the corresponding device state information Is to the portable terminal device 3.

FIG. 7 is a diagram illustrating an example of state management information I1 generated by the state information management unit F3.

The state information management unit F3 manages current information of device state information Is of each item by using this state management information I1.

For example, in response to switching the item "recording/reproducing operation state" in the drawing among REC, PLAY, and STANDBY, state information after switching is stored in the state management information I1. Similarly, in response to switching setting in "system frequency" and "recording format" in the drawing, information indicating states after switching (for example, a frequency after switching for "system frequency" and a format after switching for "recording format") is stored in the state management information I1.

Furthermore, current information is obtained, for example, every fixed time period for "load state", "remaining battery capacity", and "remaining medium capacity" in the drawing, and the current information is stored in the state management information I1.

In response to a request for device state information Is that has been made by using code information, the transmission processing unit F4 performs processing for obtaining requested device state information Is from among pieces of device state information Is that have been stored in such state management information I1, and transmitting the requested device state information Is to the portable terminal device 3.

Note that as the device state information Is, device state information Is in which the content of information can relatively frequently change, such as a load state or a system frequency, may not be regarded as a target to be managed in the state management information I1, and current information may be obtained by using a request from the portable terminal device 3 as a trigger.

Figure 8A:
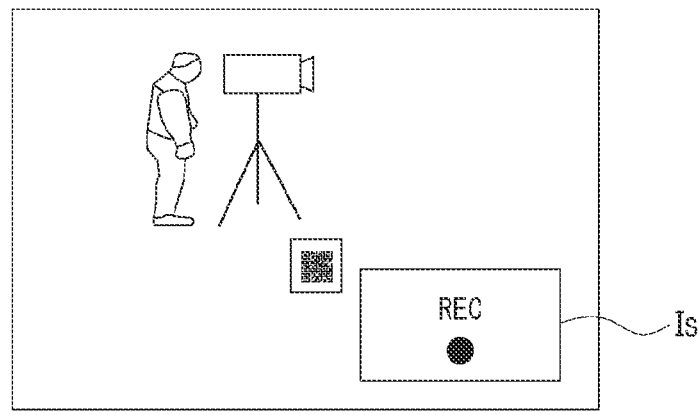
FIGS. 8A, 8B, and 8C are explanatory diagrams of a display example of device state information.
Figure 8B:
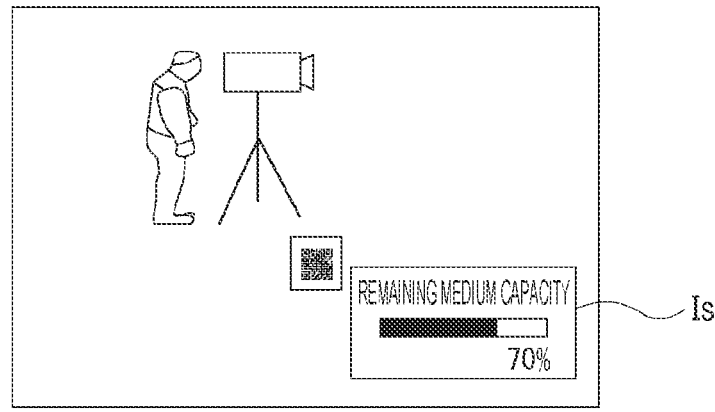
Figure 8C:
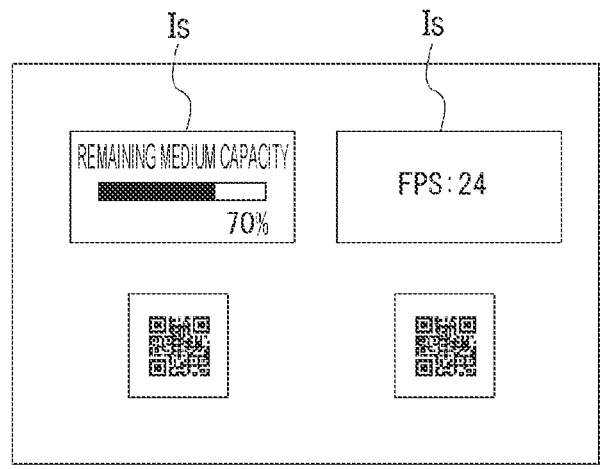

FIGS. 8A, 8B, and 8C are explanatory diagrams of a display example of device state information Is in the portable terminal device 3.

In the present example, device state information Is is displayed in a position on a code captured image that has been determined by using, as a reference, a position of code information in the code captured image.

FIGS. 8A and 8B respectively illustrate an example where information relating to a recording/reproducing operation state (in the drawing, an example of "REC") is displayed as the device state information Is, and an example where information relating to a remaining medium capacity is displayed as the device state information Is. As illustrated as an example in these diagrams, in the present example, the device state information Is is displayed in a right-hand obliquely lower position of code information in a code captured image.

Note that such a relationship of a position of the device state information Is relative to a position of the code information is merely an example, and a variety of relationships are conceivable. For example, the device state information Is may be displayed in a position where lateral centers or vertical centers of the code information and the device state information Is match each other, or the device state information Is may be displayed in a position that coves the entirety or part of the code information.

As described above, device state information Is is displayed in a position that has been determined by using, as a reference, a position of code information in a code captured image, and therefore the device state information Is can be displayed in a position that is assumed to be appropriate by using a position of the code information as a reference.

In particular, as illustrated in FIG. 8C, in a case where plural pieces of code information have been captured in a captured image, each device state information Is is displayed in a position that has been determined by using corresponding code information as a reference, and this can cause a user to intuitively understand which code information device state information is displayed in association with.

Furthermore, in the present example, the display processing unit F6 switches a display mode of device state information Is according to the type of the device state information Is. Specifically, as illustrated as an example in comparison between FIGS. 8A and 8B, with respect to information relating to a recording/reproducing operation state, a mark indicating the type of an operation state (specifically, in the case of REC, a red circular mark) is displayed, and with respect to information relating to a remaining medium capacity, a bar indicating a remaining capacity is displayed. Note that conceivable examples of a display of the recording/reproducing operation state include a display of a rightward pointing triangular mark in the case of PLAY, a display of a rectangular mark in the case of STANDBY, and the like.

A case where a bar is displayed for a remaining medium capacity has been described above as an example. Such a display of a bar can be applied to device state information in which a state of a device is expressed as an amount, such as a remaining battery capacity or a load state.

In this case, expression of an amount is not limited to the display of a bar, as described above as an example, and other graphical expression, such as a display of a meter, can also be used.

Furthermore, the device state information Is can also be displayed in a mode having transparency. For example, it is conceivable that a display mode in which a translucent display object is displayed in such a way that a background is seen through is employed.

Here, in the present embodiment, it is assumed that a technique for requesting device state information Is from the imaging device 1 by using code information is employed. Output code information can be displayed in an arbitrary position. The code information can be displayed in an arbitrary position, for example, in such a way that a paper sheet on which the code information has been printed and output is disposed in an arbitrary position, or is displayed in a desired display device outside the imaging device 1. The employment of the technique for requesting device state information Is from the imaging device 1 by using code information has an advantage in which the code information can be displayed in an arbitrary position, as described above.

For example, in displaying a remaining battery capacity as the device state information Is, the remaining battery capacity is strongly associated with a battery case. If code information is disposed near the battery case, and the remaining battery capacity is caused to be displayed when a device that reads the code information (in the present example, the portable terminal device 3) is directed to the battery case, usability for a user can be improved.

By employing the technique for requesting device state information Is from the imaging device 1 by using code information, the code information can be displayed in an appropriate position that corresponds to the type of device state information, for example, in such a way that the code information is displayed near a battery case in the example described above of a remaining battery capacity.

By doing this, a user can cause device state information Is to be displayed, by directing a reading device to a position that has relevance to device state information to be checked, and this can improve usability at a time when the user checks desired device state information Is.

1-3. Processing Procedures

A specific example of processing procedures for achieving the information display technique described above that serves as an embodiment is described with reference to the flowcharts of FIGS. 9 to 11.

Figure 9:
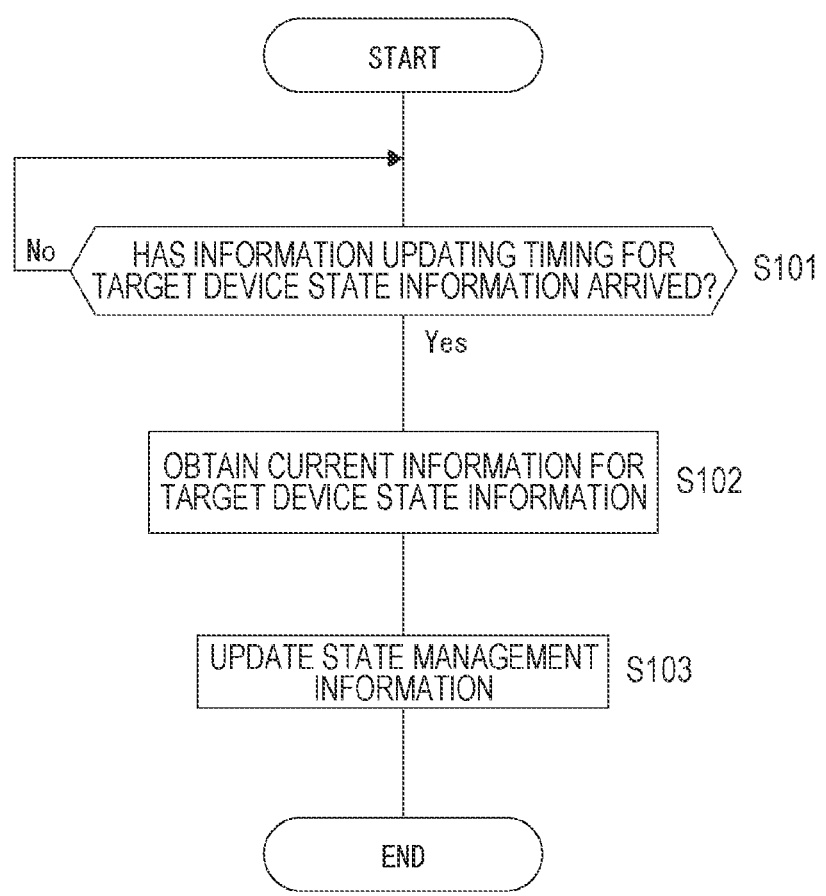
FIG. 9 is a flowchart illustrating processing performed by a state information management unit according to an embodiment.

FIG. 9 is a flowchart illustrating processing performed by the state information management unit F3 in the imaging device 1. Note that the control unit 16 performs the processing illustrated in FIG. 9 for each device state information Is to be managed in the state management information I1 (that is, each device state information Is that is assumed to be a selection candidate on the item selection screen G2).

In FIG. 9, in step S101, the control unit 16 stands by for an information updating timing of target device state information Is. For example, as described above as an example, with respect to a recording/reproducing operation state, a timing at which switching has been performed among REC, PLAY, and STANDBY is an information updating timing, and with respect to setting state information Iss such as a system frequency or a recording format, a timing at which settings have been switched is an information updating timing. Furthermore, with respect to a load state, a remaining battery capacity, and a remaining medium capacity, for example, a timing after every fixed time period is an information updating timing. In step S101, the arrival of an information updating timing that has been determined according to the type of device state information Is, as described above, is stood by for.

If the information updating timing has arrived, the processing of the control unit 16 proceeds to step S102, and current information of the target device state information Is is obtained. In step S103 that follows, processing for updating state management information I1 is performed. In other words, processing is performed to update target device state information Is stored in the state management information I1 to the current information obtained in step S102.

In response to performing the process of step S103, the control unit 16 terminates the series of processes illustrated in FIG. 9.

Note that an example where a different information updating timing is set according to the type of device state information Is has been described above. However, the information updating timing can be a common timing regardless of the device state information Is.

Furthermore, in a case where a different information updating timing is used according to each type of device state information Is, it is also conceivable that an item that has a relatively low frequency of a change in information, such as a recording/reproducing operation state, is updated at a timing according to a change in a state, and an item that has a relatively high frequency of a change in information, such as a load state or a remaining medium capacity, is updated at a fixed timing, for example, every one second.

Here, it is not necessary to manage all pieces of device state information Is in the state management information I1. For example, a technique for only managing information having a lower frequency of a change in a state in the state management information I1, and obtaining and transmitting current information of information having a higher frequency of a change in a state at the timing of a request from the portable terminal device 3 can also be employed.

Alternatively, a technique for obtaining and transmitting current information of all pieces of device state information Is at the timing of a request from the portable terminal device 3, as described above, can also be employed.

Figure 10:
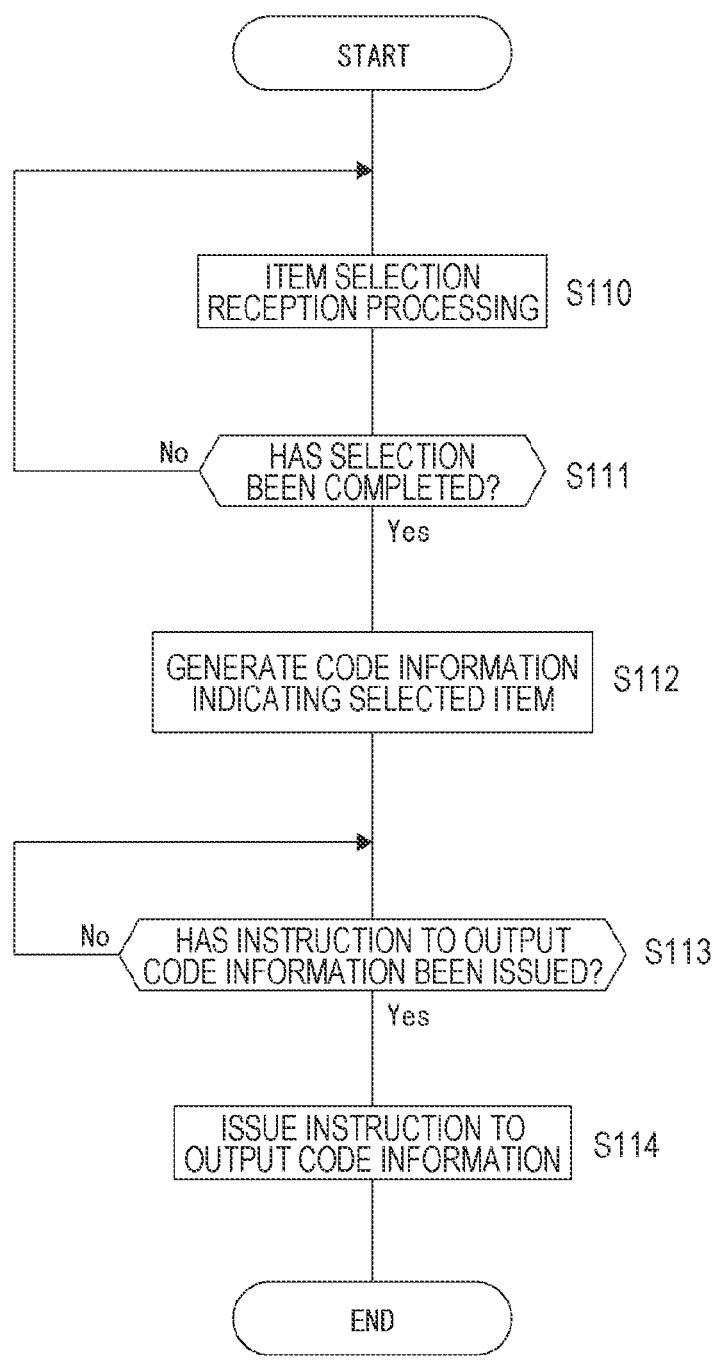
FIG. 10 is a flowchart illustrating processing performed by an item selection reception unit and a code information generation unit according to an embodiment.

FIG. 10 is a flowchart illustrating processing performed by the item selection reception unit F1 and the code information generation unit F2 in the imaging device 1. Note that it is assumed that the processing illustrated in FIG. 10 is started in a state where the item selection screen G2 has already been displayed in the display unit 13.

First, in step S110, the control unit 16 performs item selection reception processing. In other words, in response to an input of a user's manipulation, processing for updating the content of a display on the item selection screen G2 (for example, processing relating to a movement of the cursor CR, addition of a check mark to a check box, or the like) is performed.

In step S111 that follows, the control unit 16 determines whether or not selection has been competed, and specifically, whether or not the COMPLETE SELECTION button B1 has been manipulated. In a case where the COMPLETE SELECTION button B1 has not been manipulated and it has been determined that selection has not been completed, the processing of the control unit 16 returns to step S110. By doing this, a state of receiving item selection performed by a user is continued until the COMPLETE SELECTION button B1 is manipulated.

In step S111, in a case where it has been determined that selection has been completed, the processing of the control unit 16 proceeds to step S112, and code information (in the present example, a QR code) indicating a selected item is generated. In response to generation of the code information, as described above, the control unit 16 performs processing for causing the display unit 13 to display a code display screen G3 including an image of the generated code information, but this is not illustrated.

In step S113 after step S112, the control unit 16 stands by for an instruction to output the code information. Specifically, a manipulation performed on the OUTPUT button B3 on the code display screen G3 is stood by for.

In a case where the OUTPUT button B3 has been manipulated, and it has been determined that an instruction to output the code information has been issued, the processing of the control unit 16 proceeds to step S114, an instruction to print and output the generated code information is issued to the code output device 2, and the series of processing illustrated in FIG. 10 is terminated.

Figure 11:
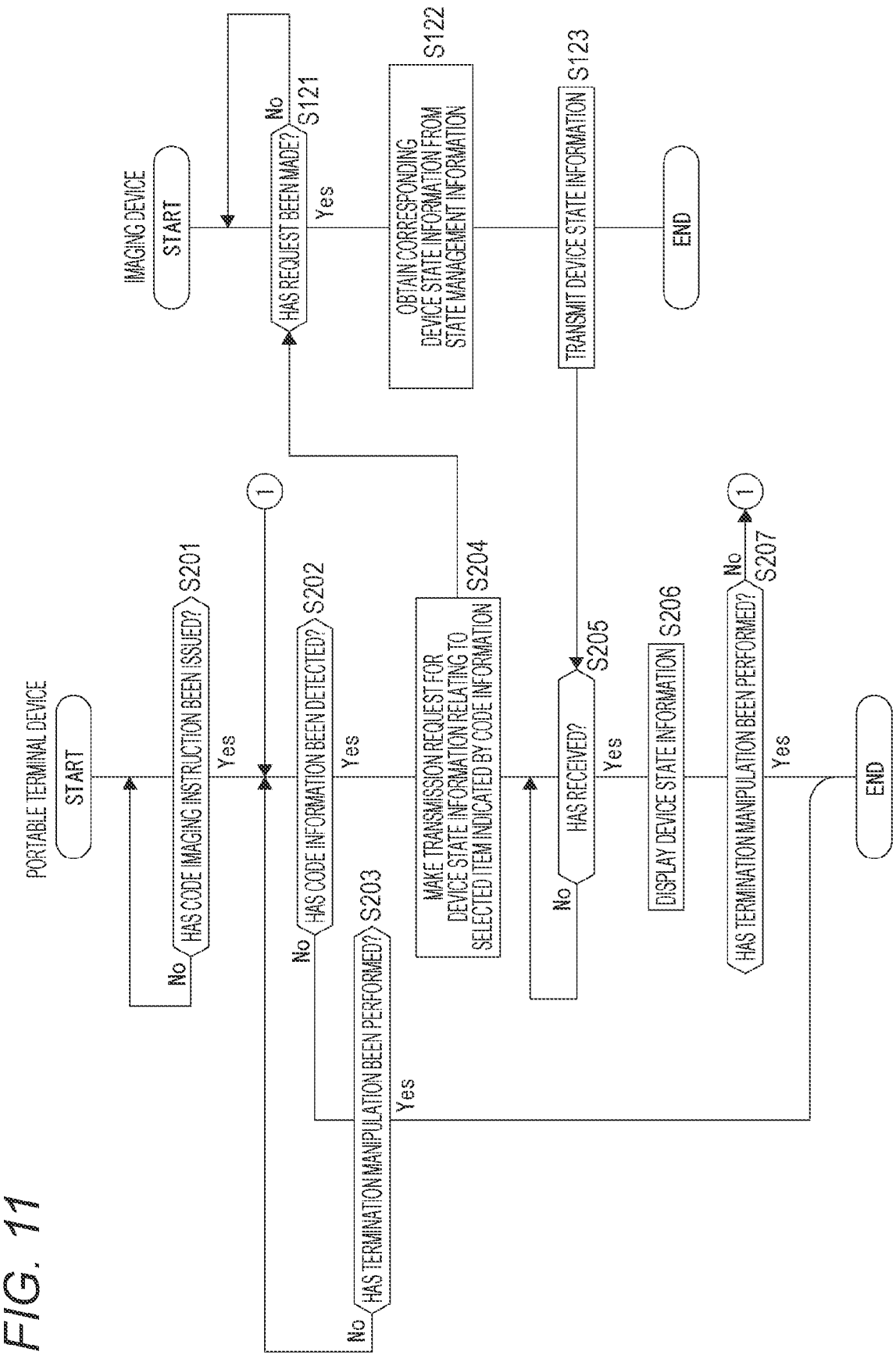
FIG. 11 is a flowchart illustrating processing performed by a request unit and a display processing unit serving as an embodiment in a display device (a portable terminal device), and processing performed by a transmission processing unit serving as an embodiment in an information processing device (an imaging device).

FIG. 11 is a flowchart illustrating processing performed by the request unit F5 and the display processing unit F6 in the portable terminal device 3, and processing performed by the transmission processing unit F4 in the imaging device 1. Note that in FIG. 11, processing that is illustrated as processing performed by the portable terminal device 3 is performed by the CPU 31, and processing that is illustrated as processing performed by the imaging device 1 is performed by the control unit 16.

First, on a side of the portable terminal device 3, the CPU 31 stands by until a code imaging instruction is issued in step S201. In the present example, an application (an application program) for reading code information or displaying device state information Is has been installed in advance in the portable terminal device 3, and a code imaging instruction in this case has been determined to be a manipulation performed by a user to activate the application. Accordingly, in step S201 in the present example, a manipulation to activate the application is stood by for.

If the application has been activated, the imaging unit 38 is activated, and enters into a state where code information can be read, and in the display unit 37, a display of an image captured by the imaging unit 38 is started.

In a case where it has been determined in step S201 that a code imaging instruction has been issued, in step S202, the CPU 31 determines whether or not code information has been detected. If code information has not been detected, the processing of the CPU 31 proceeds to step S203, and it is determined whether or not a termination manipulation has been performed. The termination manipulation described here is, for example, a manipulation to terminate the application described above. If a termination manipulation has not been performed, the processing of the CPU 31 returns to step S202. In other words, steps S202 and S203 form loop processing for standing by for any of detection of code information and a termination manipulation.

In a case where it has been determined in step S203 that a termination manipulation has been performed, the CPU 31 terminates the series of processes illustrated in FIG. 11.

Furthermore, in a case where it has been determined in step S202 that code information has been detected, the processing of the CPU 31 proceeds to step S204, and a transmission request for device state information Is relating to a selected item indicated by the code information is issued to the imaging device 1.

Here, the imaging device 1 (the control unit 16) in the present example manages each item of device state information Is by using the identifier described above, and generates information indicating the identifier as the code information. In the portable terminal device 3, such code information is read, and therefore information relating to an identifier indicating a selected item is obtained. In step S204, the CPU 31 issues, to the imaging device 1, a transmission request that specifies device state information Is to be transmitted, by using an identifier that has been obtained as described above and indicates a selected item.

In the imaging device 1, in step S121, the control unit 16 stands by for the transmission request from the side of the portable terminal device 3 that has been made in step S204, and in a case where the transmission request has been made, in step S122, the control unit 16 performs processing for obtaining corresponding device state information Is from state management information I1. In other words, from among pieces of device state information Is stored in the state management information I1, device state information Is that is specified by the identifier included in the transmission request from the side of the portable terminal device 3 is obtained.

In step S123 after step S122, the control unit 16 performs processing for transmitting the device state information Is obtained in step S122 to the portable terminal device 3, as processing for transmitting device state information Is, and terminates the series of processes illustrated in FIG. 11.

In the portable terminal device 3, in step S205 after step S204 described above, the CPU 31 is standing by for reception of the device state information Is transmitted in step S123. In a case where the device state information Is has been received, the processing proceeds to step S206, and processing for displaying the device state information Is is performed. In other words, as described above with reference to FIGS. 8A, 8B, and 8C, the display unit 37 is caused to conduct a display in such a way that the device state information Is is superimposed onto a code captured image.

Note that a specific display example of device state information Is in the present example has already been described, and a duplicate description is omitted.

In response to performing the display processing of step S206, in step S207, the CPU 31 determines whether or not a termination manipulation has been performed. In a case where it has been determined that a termination manipulation has not been performed, the processing of the CPU 31 returns to step S202. By doing this, until a termination manipulation is performed, determination as to whether or not code information has been detected (S202) and a transmission request and display processing of corresponding device state information Is (S204 to S206) in a case where the code information has been detected are repeatedly performed. In other words, if the code information continues to be detected, a transmission request and display processing of device state information Is are repeatedly performed, and in response to updating device state information Is on a side of the imaging device 1, information after updating (that is, current information) can be sequentially reflected in a display.

Furthermore, by performing the loop processing of step S202 and step S203, in a case where code information has not been detected, a transmission request or display processing of device state information Is is not performed. In other words, in a case where code information has failed to be detected, in the display unit 37, device state information Is based on the code information is not displayed either.

In a case where it has been determined in step S207 that a termination manipulation has been performed, the CPU 31 terminates the series of processes illustrated in FIG. 11.

Here, in the information display system 100 according to the embodiment, a user can manipulate the imaging device 1 to generate plural pieces of code information indicating respective different selected items, and can cause the code output device 2 to print and output these pieces of code information on different paper sheets. In this case, the printed and output pieces of code information can be disposed (displayed) in respective different positions in an imaging site. For example, code information indicating an item of a remaining battery capacity is disposed in a position near a battery case (for example, an external battery case) of the imaging device 1, and code information indicating an item of an F value is disposed in a position near a lens barrel of the imaging device 1.

In a case where different pieces of code information are disposed in respective different positions, as described above, a state is assumed where a user directs the portable terminal device 3 to certain code information (referred to as first code information) to cause the first code information to be read, and corresponding device state information Is is displayed on a code captured image of the first code information. In this state, if the portable terminal device 3 is directed to a side of other code information (referred to as second code information) in order to read the second code information, the first code information during display goes out from a frame of the display screen. At this time, the first code information fails to be read (fails to be detected), and therefore in the processing of FIG. 11, a display of device state information Is that corresponds to the first code information is also terminated. If the second code information has come in a captured image frame of the imaging unit 38, the second code information is read, and a display is conducted in such a way that device state information Is that corresponds to the second code information is superimposed onto a code captured image of the second code information.

As described above, by employing the information display system 100, in a case where plural pieces of code information are disposed at intervals that cause the plural pieces of code information fail to be simultaneously included in a captured image frame of the imaging unit 38, an orientation of the portable terminal device 3 is changed (in other words, an imaging direction of the imaging unit 38 is changed), and different code information is sequentially captured in the captured image frame. Therefore, device state information Is to be displayed can be switched.

2. Second Embodiment

Next, a second embodiment is described.

Note that in the second embodiment, a hardware configuration of the information display system 100 is similar to a hardware configuration in the case of the first embodiment, and therefore description is omitted.

In the second embodiment, code information indicating an item selected by a user is generated on a side of the portable terminal device 3 rather than the imaging device 1.

An example of specific operation procedures is illustrated in FIG. 12.

First, as illustrated as procedure <1>, a user is caused to select an item that is desired to be displayed, by using a screen of the portable terminal device 3. In this case, the display unit 37 of the portable terminal device 3 is caused to display an item selection screen G2, as illustrated as an example in FIG. 6B. Therefore, item information of device state information Is serving as a selection candidate (for example, information relating to the name of an item or information relating to an identifier for each item) has been stored in advance in the portable terminal device 3.

Next, the portable terminal device 3 generates code information indicating a selected item, as illustrated as procedure <2>, and issues, to the code output device 2, an instruction to output the code information in procedure <3>.

Note that procedure <4> and procedure <5> are similar to procedures in the case of FIG. 5, and therefore description is omitted.

Furthermore, in the portable terminal device 3, procedure <6> and procedure <7> are similar to procedures in the case of FIG. 5, and therefore description is omitted.

In the imaging device 1, in a case where the portable terminal device 3 has made the request of procedure <7>, device state information Is relating to a selected item is transmitted to the portable terminal device 3 in response to the request, as illustrated as procedure <8>.

In the portable terminal device 3, if the device state information Is transmitted in procedure <8> has been received, a display is conducted in such a way that the received device state information Is is superimposed onto a code captured image, as illustrated as procedure <9>.

Figure 13A:
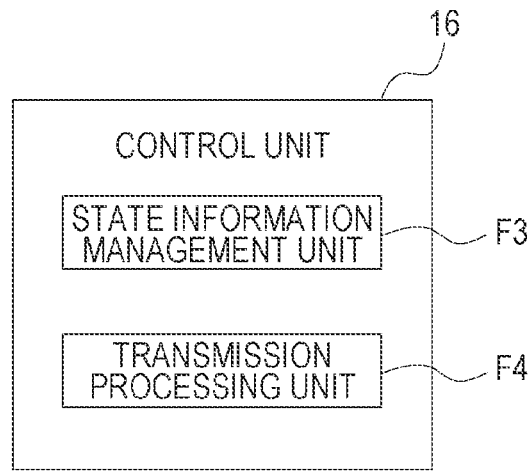
FIGS. 13A and 13B illustrate function blocks indicating functions of the information display system serving as the second embodiment in the form of a block.
Figure 13B:
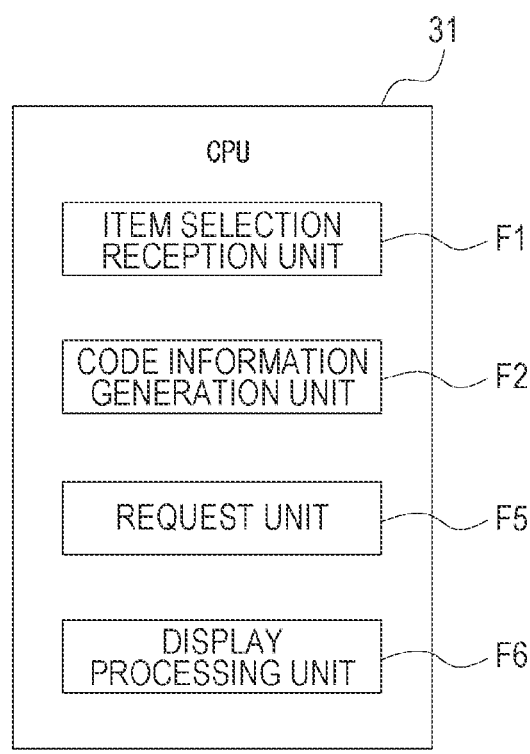

FIGS. 13A and 13B are function block diagrams for explaining functions of each of the control unit 16 and the CPU 31 in the second embodiment.

As illustrated in FIG. 13A, the control unit 16 in this case functions as the state information management unit F3 and the transmission processing unit F4. Furthermore, as illustrated in FIG. 13B, the CPU 31 in this case functions as the item selection reception unit F1, the code information generation unit F2, the request unit F5, and the display processing unit F6.

Note that processing performed by each of the state information management unit F3, the transmission processing unit F4, the request unit F5, and the display processing unit F6 is similar to the processing described with reference to FIGS. 9 to 11, and therefore description is omitted.

Furthermore, processing performed by the item selection reception unit F1 or the code information generation unit F2 in this case is similar to the processing described with reference to FIG. 10 excluding a change in a performing subject from the control unit 16 to the CPU 31, and therefore description is omitted.

Code information is generated on a side of the portable terminal device 3, and therefore reception of a manipulation relating to generation of code information, such as a manipulation to select an item of device state information Is that is desired to be displayed, can be performed on the side of the portable terminal device 3 rather than a side of the imaging device 1.

Accordingly, trouble in which a user has to go to a place where the user can manipulate the imaging device 1 in order to generate code information can be eliminated.

Furthermore, in a case where each of a plurality of users desires to generate code information, a situation where a manipulation performed on the imaging device 1 is waited for (a situation where a waiting time is generated until another user has completed a manipulation to generate code information) can be avoided.

3. Variations

Here, embodiments are not limited to the specific examples described above as examples, and a variety of variations are conceivable.

Figure 14:
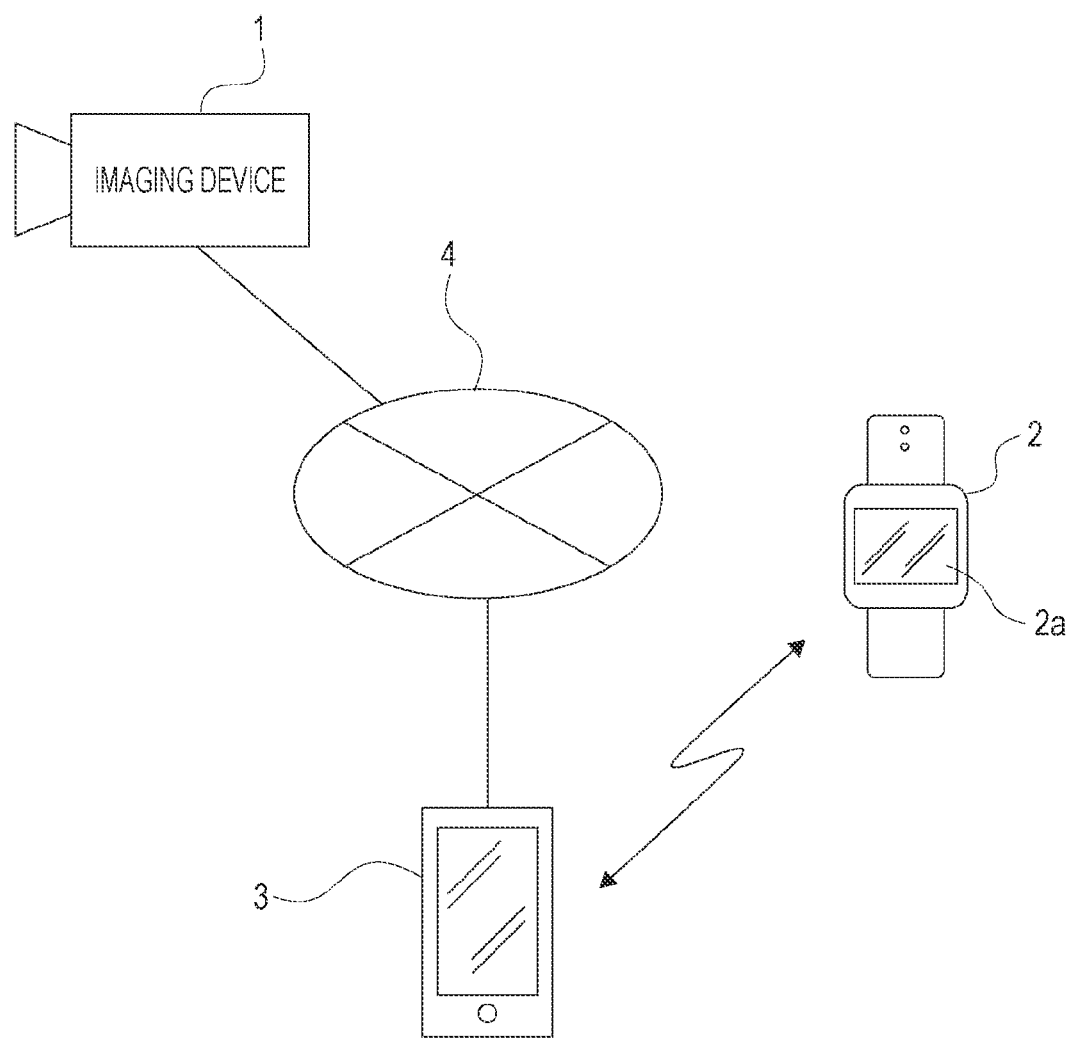
FIG. 14 is an explanatory diagram illustrating a variation of a code output device (a code information output unit).

For example, a point that the code output device 2 can be configured as a display device, that is, a point that a technique in which code information that the display device has been caused to display and output is read by the portable terminal device 3, has been described above. As an example of a case where the code output device 2 is a display device, as described above, it is conceivable that the code output device 2 is configured as a wristwatch type display device such as a smart watch, as illustrated in FIG. 14. The code output device 2 in this case is provided with a display unit 2a in a position that corresponds to a dial of a wristwatch, and device state information Is can be displayed in the display unit 2a. Note that a case where a wristwatch type display device such as a smart watch does not have a function of connection to the network 4 such as the Internet or a LAN is assumed, and it is assumed that only short-range wireless communication, such as Bluetooth (registered trademark), can be performed with the portable terminal device 3. Accordingly, in this case, it is desirable that an instruction to output generated code information be issued from the portable terminal device 3 to the code output device 2, as described as an example in the second embodiment.

Furthermore, an example where the code output device 2 is configured separately from the imaging device 1 or the portable terminal device 3 has been described above. However, the code output device 2 may be configured integrally with the imaging device 1 or the portable terminal device 3.

For example, in a case where the code information generation unit F2 is provided in the imaging device 1, as described in the first embodiment and in a case where a printer is used as the code output device 2, and it can be considered that a configuration in which the printer is integrated with the imaging device 1 is employed. Alternatively, in a case where a printer is similarly used as the code output device 2 and in a case where the code information generation unit is provided in the portable terminal device 3, as described in the second embodiment, it can be considered that a configuration in which the printer is integrated with the portable terminal device 3 is employed.

Furthermore, code information can also be displayed and output on a display included in the imaging device 1. In this case, the code output device 2 is configured integrally with the imaging device 1.

Furthermore, the information display system 100 can also employ a configuration in which a plurality of imaging devices 1 is provided. In this case, a user causes each of the plurality of imaging devices 1 to generate code information, and causes the portable terminal device 3 to read respective pieces of code information, and therefore a single portable terminal device 3 can check pieces of device state information Is of the plurality of imaging devices 1.

Furthermore, the information display system 100 can also be configured as a system in which a plurality of portable terminal devices 3 is provided. In this case, it is conceivable that each user serving as a staff member is caused to use the portable terminal device 3. By doing this, each of the staff members can check desired device state information Is for a target imaging device 1.

Furthermore, a case where an information processing device according to the present technology is an imaging device 1 has been described above as an example. However, the information processing device according to the present technology can be widely suitably applied to various types of electronic equipment that can be assumed to display state information of a device, such as audio equipment serving as sound recording equipment or the like or industrial or consumer robot equipment.

4. Summary of Embodiments

As described above, an information processing device (an imaging device 1) serving as an embodiment includes a transmission processing unit (a transmission processing unit F4) that performs processing for transmitting device state information (device state information Is) relating to a selected item to an external device of a request source, in response to a request for the device state information relating to the selected item that has been made by the external device, by using code information indicating the selected item, the selected item being an item that has been selected by a user for the device state information indicating a state of a device.

As described above, code information indicating an item selected by a user is used, and therefore only device state information that the user desires to check can be transmitted to an external device. Furthermore, device state information that corresponds to a device of a request source is transmitted in response to a request that has been made by using code information, and therefore a device that will receive and display the transmitted device state information can be an arbitrary device. In other words, device state information can be displayed in an arbitrary place.

Accordingly, by employing the information processing device serving as the embodiment, device state information that a user desires to check can be displayed in a place desired by the user.

Furthermore, the information processing device serving as the embodiment includes a code information generation unit (a code information generation unit F2) that generates code information indicating a selected item on the basis of a manipulation performed by a user (see FIGS. 4A and 4B and the first embodiment).

By doing this, communication with another device can be omitted in generating code information.

Accordingly, a processing load relating to generation of code information can be reduced.

Moreover, in the information processing device serving as the embodiment, the external device repeatedly makes a request, and the transmission processing unit performs processing for obtaining and transmitting device state information for each of the requests from the external device (see FIG. 11).

By doing this, roughly real-time state information can be transmitted as device state information.

Accordingly, the accuracy of device state information to be displayed to a user can be improved.

Here, roughly real time does not only mean strict real time, but is a concept that includes immediate time, the same time, real time, or immediate time, the same time, or real time including various types of delay time or the like.

An information display system (an information display system 100) serving as an embodiment is an information display system that includes at least an information processing device (an imaging device 1) and a display device (a portable terminal device 3), the information display system including: a code information generation unit (a code information generation unit F2) that generates code information indicating a selected item, the selected item being an item that has been selected by a user for device state information indicating a state of the information processing device; a code information output unit (a code output device 2) that outputs the code information that has been generated by the code information generation unit; a request unit (a request unit F5) that is provided in the display device, reads the code information that has been output by the code information output unit, and makes a request for the information processing device to transmit the device state information relating to the selected item indicated by the code information; a transmission processing unit (a transmission processing unit F4) that is provided in the information processing device, and performs processing for transmitting the device state information relating to the selected item to the display device, in response to the request; and a display processing unit (a display processing unit F6) that is provided in the display device, and performs processing for displaying the device state information that has been transmitted by the transmission processing unit (see FIGS. 4A, 4B, 13A, and 13B, or the like).

By employing such an information display system serving as an embodiment, effects that are similar to effects of the information processing device described above serving as an embodiment can also be exhibited.

Accordingly, device state information that a user desires to check can be displayed in a place desired by the user.

Furthermore, in the information display system serving as the embodiment, the code information output unit prints and outputs code information (see FIG. 5).

By doing this, a printed medium such as a paper sheet on which the code information has been printed can be disposed in an arbitrary position, and the code information can be displayed in an arbitrary position desired by a user.

A device that displays code information does not need to be used to display the code information in an arbitrary position, and therefore power consumption for maintaining a display state of the conde information can be eliminated.

Furthermore, in this case, in displaying code information, it is sufficient if a paper sheet or the like on which the code information has been printed is stuck in a desired position, and a degree of freedom of choosing a position where code information will be displayed can be improved (in comparison with a case where the device that displays the code information is used).

Moreover, in the information display system serving as the embodiment, the code information output unit displays and outputs code information.

In other words, the code information is displayed by a display device.

In a case where the code information is printed and output, in switching code information to be displayed, new code information needs to be printed and output. However, code information is displayed by the display device, and this can make it easy to switch code information to be displayed.

Moreover, in the information display system serving as the embodiment, the code information generation unit is provided in the display device (see FIGS. 13A and 13B and the second embodiment).

By doing this, a manipulation relating to generation of code information, such as a manipulation to select an item of device state information that is desired to be displayed, can be received on a side of the display device.

Accordingly, trouble in which a user has to go to a place where the user can manipulate the information processing device in order to generate code information can be eliminated.

Furthermore, in a case where each of a plurality of users desires to generate code information, a situation where a manipulation performed on the information processing device is waited for can be avoided.

Furthermore, in the information display system serving as the embodiment, the display processing unit switches a display mode of device state information according to the type of the device state information (see FIGS. 8A, 8B, and 8C or the like).

By doing this, device state information can be displayed by using an appropriate mode according to the type of device state information, for example, in such a way that with respect to device state information in which a state of a device is expressed as an amount, such as a remaining battery capacity, the amount is displayed by using a bar, or in such a way that with respect to device state information indicating a recording/reproducing operation state, such as REC, PLAY, or STANDBY, a display is conducted by using a mark that corresponds to each of the states (for example, a red circular mark in the case of REC, a rightward pointing triangular mark in the case of PLAY, or the like).

Accordingly, easiness of a user checking device state information can be improved.

Moreover, in the information display system serving as the embodiment, the display processing unit performs processing for superimposing device state information onto a captured image obtained by imaging code information in order to read the code information, and displaying the device state information (see FIGS. 8A, 8B, and 8C or the like).

By doing this, the display device is directed to a direction of a display position of the code information (a camera that is provided in the display device and reads the code information is directed), and therefore device state information can be displayed to a user.

Accordingly, a user can check device state information by causing code information to be displayed in a position that has relevance to device state information to be checked, and performing an intuitive manipulation to direct the display device in a direction of a display position of the code information, and usability to the user can be improved.

Moreover, in the information display system serving as the embodiment, the display processing unit performs processing for displaying device state information in a position on a captured image that has been specified by using, as a reference, a position of code information in the captured image (see FIGS. 8A, 8B, and 8C or the like).

By doing this, on the captured image, device state information can be displayed in a position that has a predetermined positional relationship with a position of code information, such as a position that does not overlap the code information or a position that overlaps the code information.

Accordingly, device state information can be displayed in a position that is assumed to be appropriate by using a position of code information as a reference.

For example, in a case where plural pieces of code information are captured in a captured image, a user can be caused to intuitively understand which code information device state information is displayed in association with.

An information display method serving as an embodiment is an information display method in an information display system that includes at least an information processing device and a display device, the information display method including: generating code information indicating a selected item, the selected item being an item that has been selected by a user for device state information indicating a state of the information processing device; and outputting the code information that has been generated, in which the display device performs reading the code information that has been output, and requesting, from the information processing device, the device state information relating to the selected item indicated by the code information, the information processing device performs processing for transmitting the device state information relating to the selected item to the display device, in response to the requesting, and the display device performs processing for displaying the device state information that has been transmitted.

By employing such an information display method serving as an embodiment, functional effects that are similar to functional effects of the information processing device or the information display system serving as the embodiment described above can also be exhibited.

A program according to an embodiment is a program that causes an information processing device to achieve a function of transmitting device state information relating to a selected item to an external device of a request source, in response to a request for the device state information relating to the selected item that has been made by the external device, by using code information indicating the selected item, the selected item being an item that has been selected by a user for the device state information indicating a state of a device.

In other words, the program is a program that causes the information processing device to perform, for example, processing performed by the imaging device 1 that has been described with reference to FIGS. 9 to 11.

By employing such a program, the information processing device serving as the embodiment can be easily implemented.

Then, such a program can be stored, in advance, in a recording medium incorporated into equipment such as a computer device, a ROM in a microcomputer including a CPU, or the like. Alternatively, such a program can be transitorily or permanently stored in a removable recording medium such as a semiconductor memory, a memory card, an optical disk, a magneto-optical disk, or a magnetic disk. Furthermore, such a removable recording medium can be provided as what is called package software.

Furthermore, such a program can be installed in a personal computer or the like from the removable recording medium, or can be downloaded from a download site via a network such as a LAN or the Internet.

Note that the effects described herein are only illustrative and are not restrictive, and other effects may be exhibited.

5. Present Technology

Note that the present technology can also employ the configuration described below.

(1)
An information processing device including
a transmission processing unit that performs processing for transmitting device state information relating to a selected item to an external device of a request source, in response to a request for the device state information relating to the selected item that has been made by the external device, by using code information indicating the selected item, the selected item being an item that has been selected by a user for the device state information indicating a state of a device.

(2)
The information processing device according to (1) described above, further including
a code information generation unit that generates the code information indicating the selected item on the basis of a manipulation performed by the user.

(3)
The information processing device according to (1) or (2) described above,
in which the external device repeatedly makes the request, and
the transmission processing unit performs
processing for obtaining and transmitting the device state information for each of the requests from the external device.

(4)
An information display system that includes at least an information processing device and a display device, the information display system including:

a code information generation unit that generates code information indicating a selected item, the selected item being an item that has been selected by a user for device state information indicating a state of the information processing device;
a code information output unit that outputs the code information that has been generated by the code information generation unit;
a request unit that is provided in the display device, reads the code information that has been output by the code information output unit, and makes a request for the information processing device to transmit the device state information relating to the selected item indicated by the code information;
a transmission processing unit that is provided in the information processing device, and performs processing for transmitting the device state information relating to the selected item to the display device, in response to the request; and
a display processing unit that is provided in the display device, and performs processing for displaying the device state information that has been transmitted by the transmission processing unit.

(5)
The information display system according to (4) described above,
in which the code information output unit prints and outputs the code information.

(6)
The information display system according to (4) described above,
in which the code information output unit displays and outputs the code information.

(7)
The information display system according to any of (4) to (6) described above,
in which the code information generation unit is provided in the display device.

(8)
The information display system according to any of (4) to (7) described above,
in which the display processing unit performs
switching a display mode of the device state information according to a type of the device state information.

(9)
The information display system according to any of (4) to (8) described above,
in which the display processing unit performs
processing for superimposing the device state information onto a captured image obtained by imaging the code information in order to read the code information, and displaying the device state information.

(10)
The information display system according to (9) described above,
in which the display processing unit performs
processing for displaying the device state information in a position on the captured image, the position having been specified by using, as a reference, a position of the code information in the captured image.

(11)
An information display method in an information display system that includes at least an information processing device and a display device, the information display method comprising:
generating code information indicating a selected item, the selected item being an item that has been selected by a user for device state information indicating a state of the information processing device; and
outputting the code information that has been generated, in which the display device performs
reading the code information that has been output, and requesting, from the information processing device, the device state information relating to the selected item indicated by the code information,
the information processing device performs
processing for transmitting the device state information relating to the selected item to the display device, in response to the requesting, and
the display device performs
processing for displaying the device state information that has been transmitted.

REFERENCE SIGNS LIST

100 Information display system
1 Imaging device
2 Code output device
2a Display unit
3 Portable terminal device
4 Network
10 Imaging unit
11 Camera signal processing unit
12 Recording/reproducing control unit
13 Display unit
14 Communication unit
15 Manipulation unit
16 Control unit
17 Bus
31 CPU
32 ROM
33 RAM
34 Bus
35 Input/output interface
36 Input unit
37 Display unit
38 Imaging unit
39 Storage unit
40 Communication unit
41 Removable recording medium
42 Drive
F1 Item selection reception unit
F2 Code information generation unit
F3 State information management unit
F4 Transmission processing unit
F5 Request unit
F6 Display processing unit
Is Device state information
Iss Setting state information
Ism Operation state information
I1 State management information

The invention claimed is:

1. An information processing device, comprising:
circuitry configured to:
control reception of a request for device state information from an external device based on code information that identifies a selected item, wherein
the selected item includes an item of the device state information selected based on user input, and
the device state information indicates a state of a target device; and
control transmission of the device state information related to the selected item to the external device, wherein the transmission is based on the request for the device state information related to the selected item.

2. The information processing device according to claim 1, wherein the circuitry is further configured to generate the code information of the selected item based on a user manipulation.

3. The information processing device according to claim 1, wherein the circuitry is further configured to:
receive a plurality of requests, including the request, from the external device
obtain the device state information for each of the plurality of requests from the external device; and
control the transmission of the device state information for each of the plurality of requests from the external device.

4. The information processing device according to claim 1, wherein the circuitry is further configured to generate the code information by a coding process to code an identifier that corresponds to the selected item of the device state information.

5. An information display system, comprising:
an information processing device configured to:
generate code information that identifies a selected item, wherein
the selected item includes an item of device state information selected based on user input, and
the device state information indicates a state of the information processing device; and
output the code information; and
a display device configured to:
read the code information output by the information processing device; and
generate a request for the information processing device to transmit the device state information related to the selected item indicated by the code information, wherein
the information processing device is further configured to transmit the device state information related to the selected item to the display device based on the request, and
the display device is further configured to control display of the device state information transmitted by the information processing device.

6. The information display system according to claim 5, wherein the information processing device is further configured to control a printer to print the code information.

7. The information display system according to claim 5, wherein the information processing device is further configured to display the code information.

8. The information display system according to claim 5, wherein the display device is further configured to generate the code information.

9. The information display system according to claim 5, wherein the display device is further configured to switch a display mode of the device state information based on a type of the device state information.

10. The information display system according to claim 5, wherein the display device is further configured to:
capture an image of the code information to read the code information; and
superimpose the device state information onto the captured image of the code information.

11. The information display system according to claim 10, wherein the display device is further configured to:

specify a position on the captured image based on a position of the code information in the captured image; and display the device state information at the specified position on the captured image.

12. An information display method, comprising:
in an information display system that includes an information processing device and a display device:
generating, by the information processing device, code information that identifies a selected item, wherein
the selected item includes an item of device state information selected based on user input, and
the device state information indicates a state of the information processing device;
outputting, by the information processing device, the code information
reading, by the display device, the code information output by the information processing device;
requesting, by the display device, the device state information related to the selected item indicated by the code information from the information processing device;
transmitting, by the information processing device, the device state information related to the selected item to the display device, based on the request; and
controlling, by the display device, display of the device state information transmitted by the information processing device.

* * * * *